United States Patent
Maman et al.

(10) Patent No.: US 10,168,181 B2
(45) Date of Patent: Jan. 1, 2019

(54) METER READING DEVICE AND SYSTEM

(71) Applicants: Arnon Maman, Naale (IL); Rafi Givon, Raanana (IL)

(72) Inventors: Arnon Maman, Naale (IL); Rafi Givon, Raanana (IL)

(73) Assignees: Arnon Maman, Naale (IL); Rafi Givon, Raanana (IL)

(*) Notice: Subject to any disclaimer, the term of this patent is extended or adjusted under 35 U.S.C. 154(b) by 0 days.

(21) Appl. No.: 15/678,137

(22) Filed: Aug. 16, 2017

(65) Prior Publication Data

US 2018/0052008 A1 Feb. 22, 2018

Related U.S. Application Data

(60) Provisional application No. 62/375,914, filed on Aug. 17, 2016.

(51) Int. Cl.
| | |
|---|---|
| *G08B 23/00* | (2006.01) |
| *G01D 4/00* | (2006.01) |
| *G06K 9/20* | (2006.01) |
| *G06K 9/46* | (2006.01) |
| *G08C 17/02* | (2006.01) |

(52) U.S. Cl.
CPC ............ *G01D 4/004* (2013.01); *G01D 4/008* (2013.01); *G06K 9/2027* (2013.01); *G06K 9/46* (2013.01); *G08C 17/02* (2013.01)

(58) Field of Classification Search
None
See application file for complete search history.

(56) References Cited

U.S. PATENT DOCUMENTS

| | | | |
|---|---|---|---|
| 6,208,266 B1* | 3/2001 | Lyons | G01D 4/004 340/870.01 |
| 2017/0364734 A1* | 12/2017 | Melugin | G06K 9/3258 |

* cited by examiner

*Primary Examiner* — Adolf Dsouza
(74) *Attorney, Agent, or Firm* — Mark M. Friedman

(57) ABSTRACT

A remote unit includes an electronics assembly, a housing, and a fastening member. The electronics assembly includes a communications module and an image sensor, having a lens with a field of view, that captures images of a display of a meter. The housing includes a cover coupled to a base member. The base member couples to the meter and includes an aperture. The electronics assembly is retained between the base member and the cover, such that the lens aligns with the aperture. The fastening member receives a portion of the housing in a hollow section. A mechanism of the fastening member attaches to a portion of the meter, maintaining the display in the field of view. The communications module transmits image data, derived from the captured images, to a hub unit. The hub unit processes the image data, and forwards information extracted from the image data to a remote server.

20 Claims, 21 Drawing Sheets

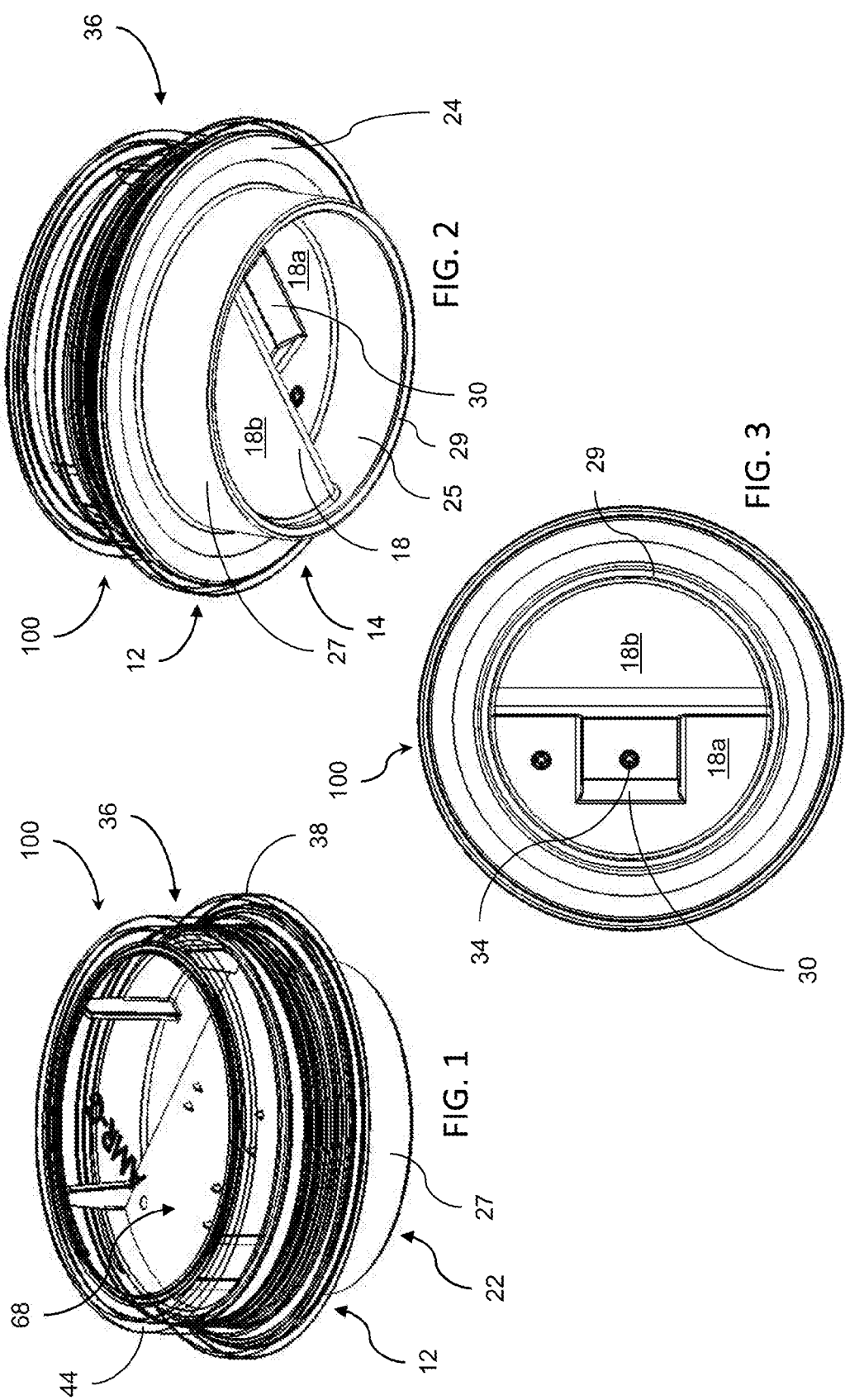

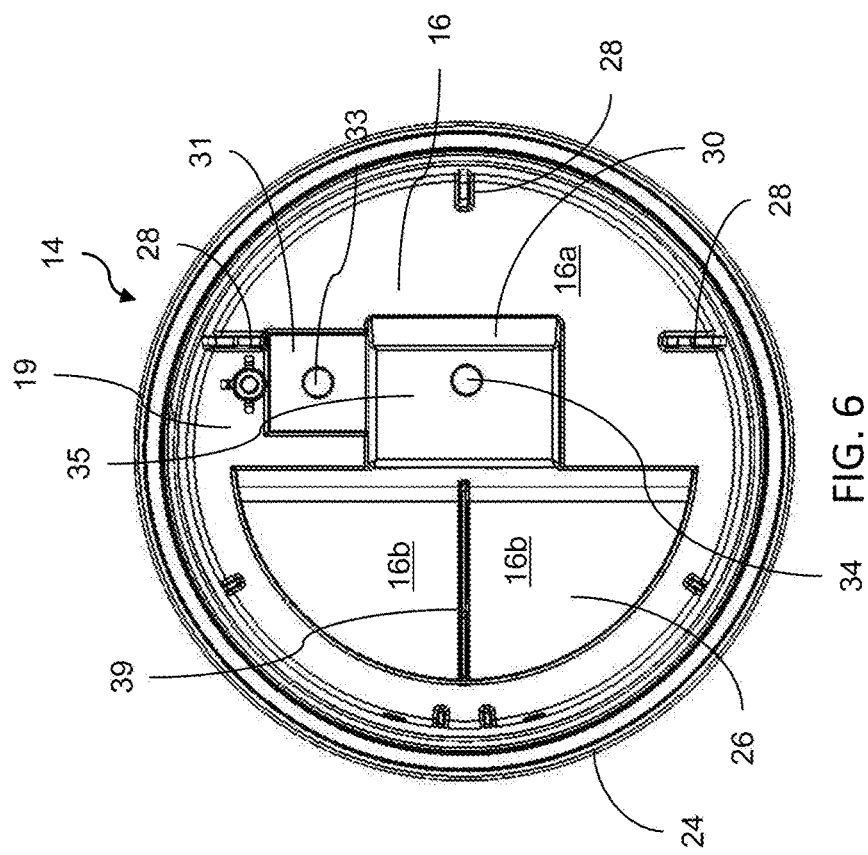
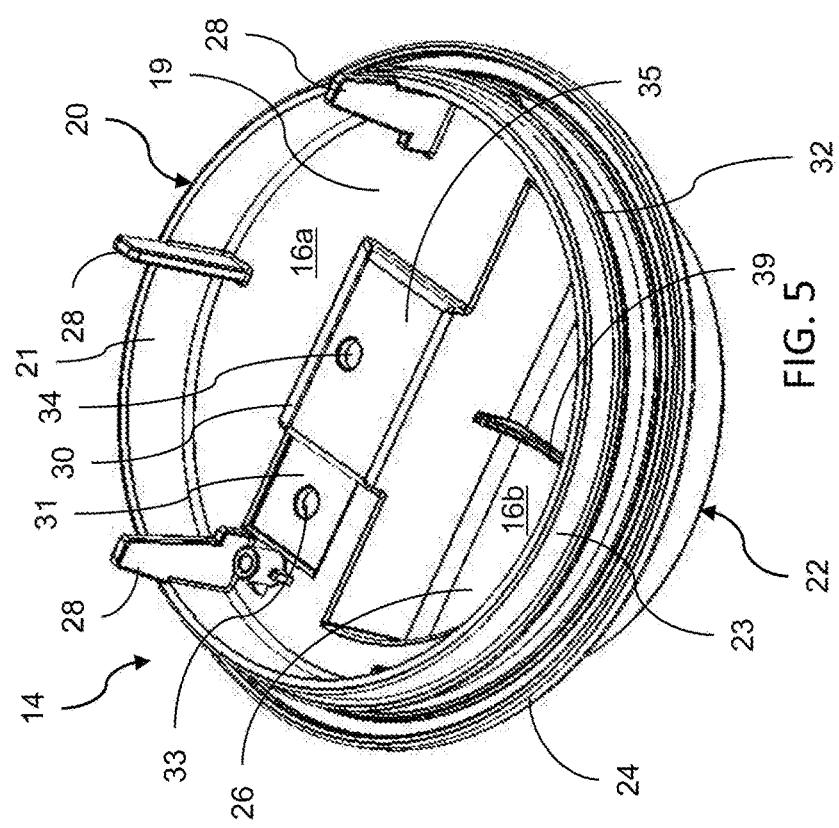

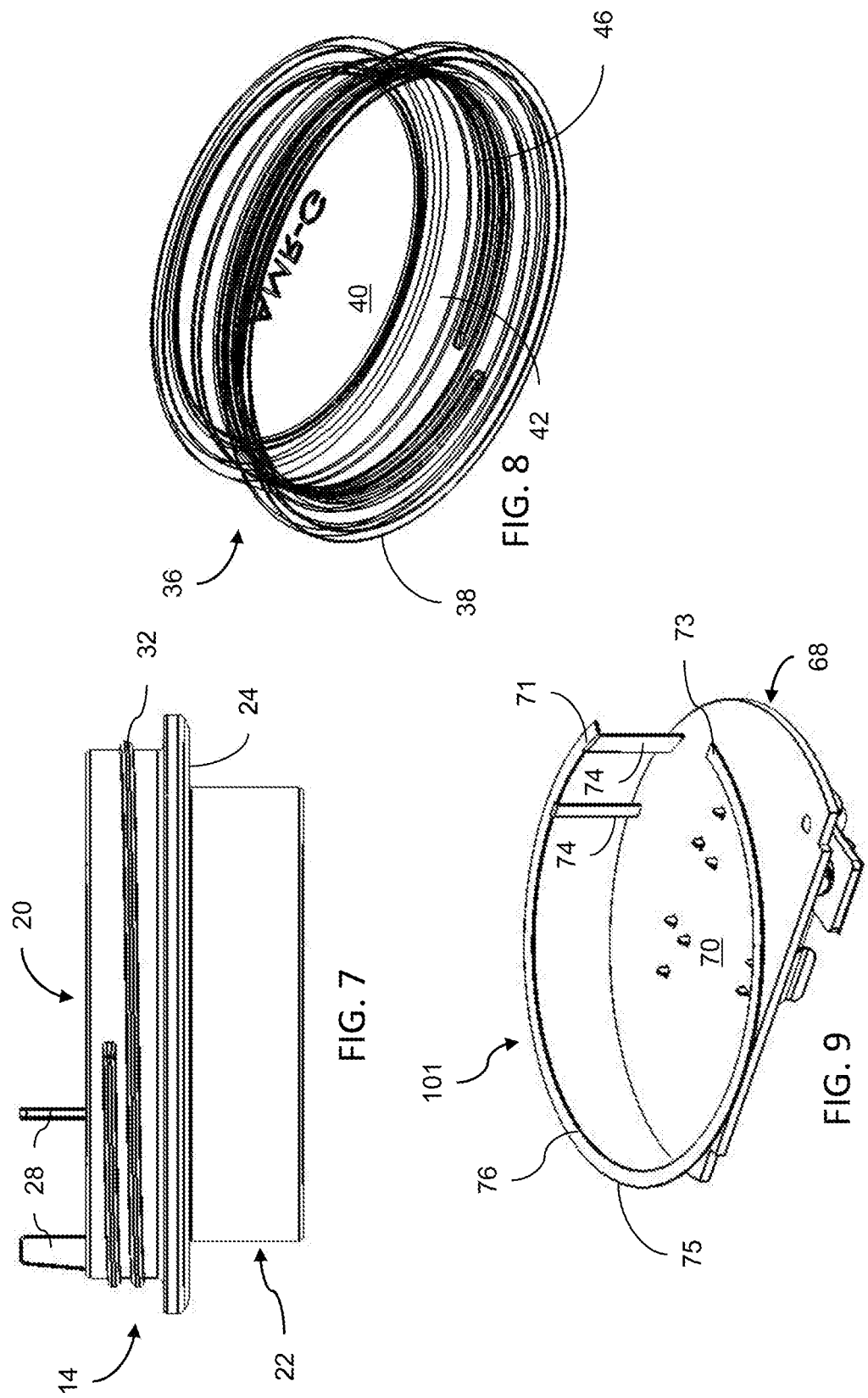

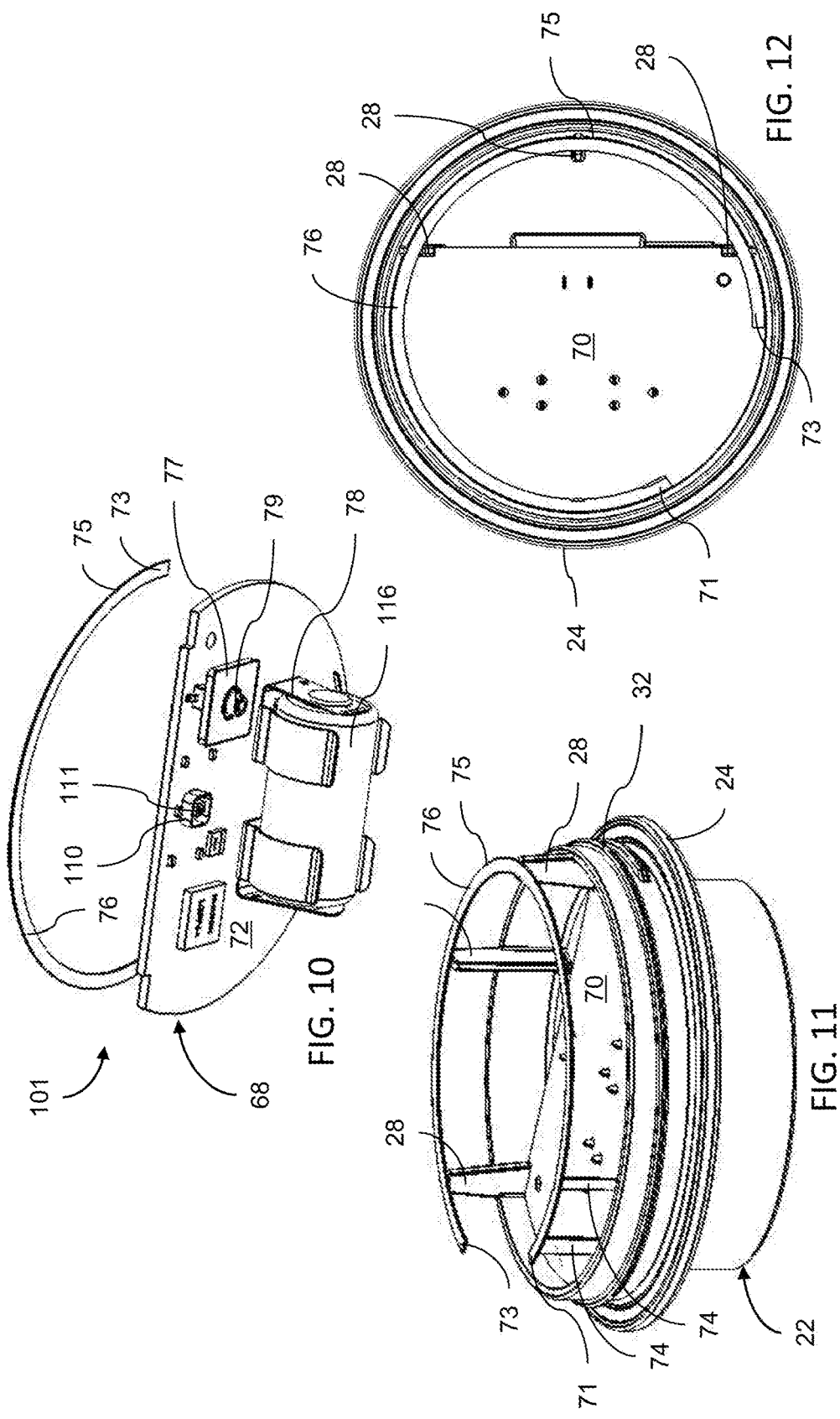

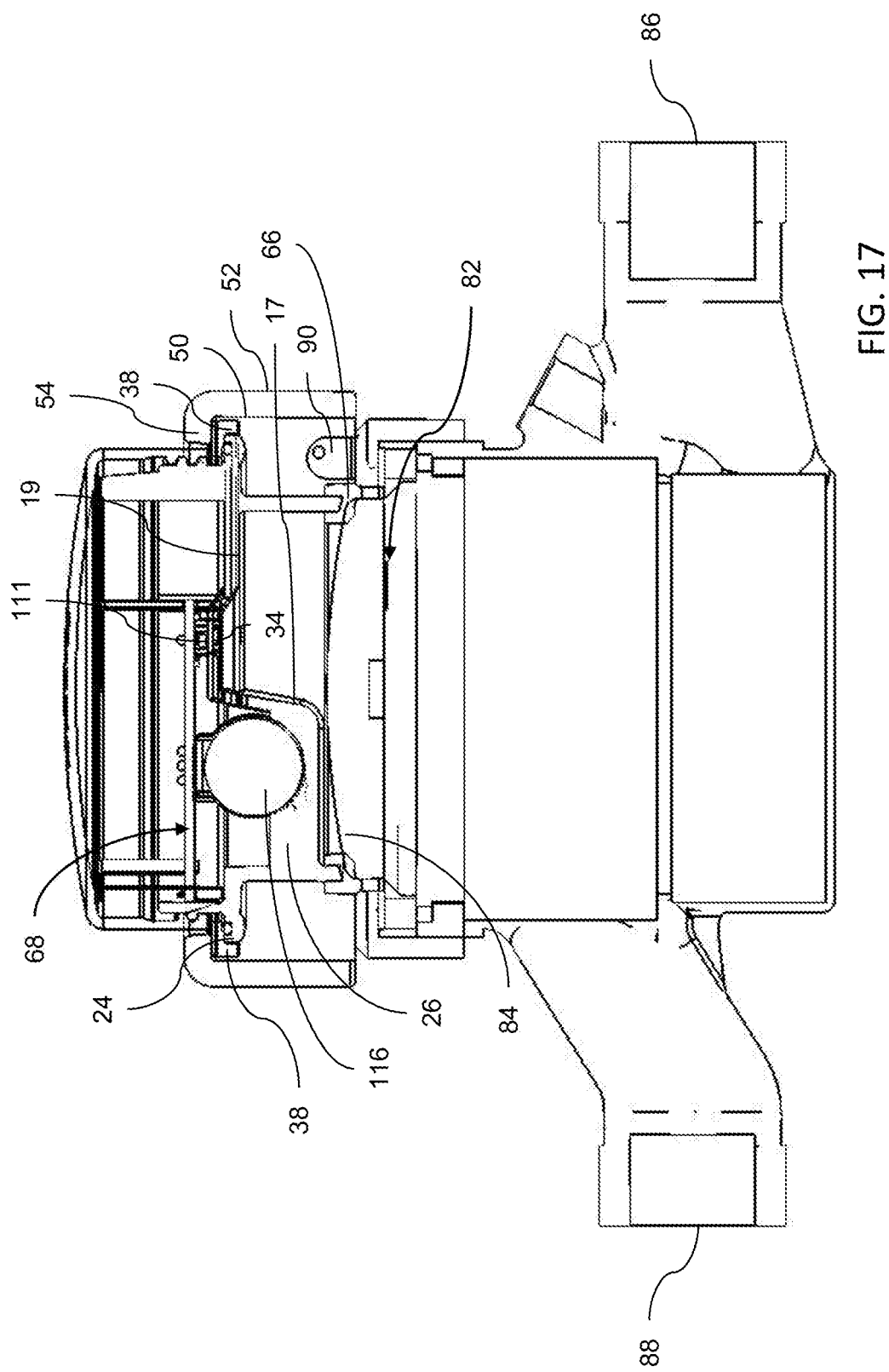

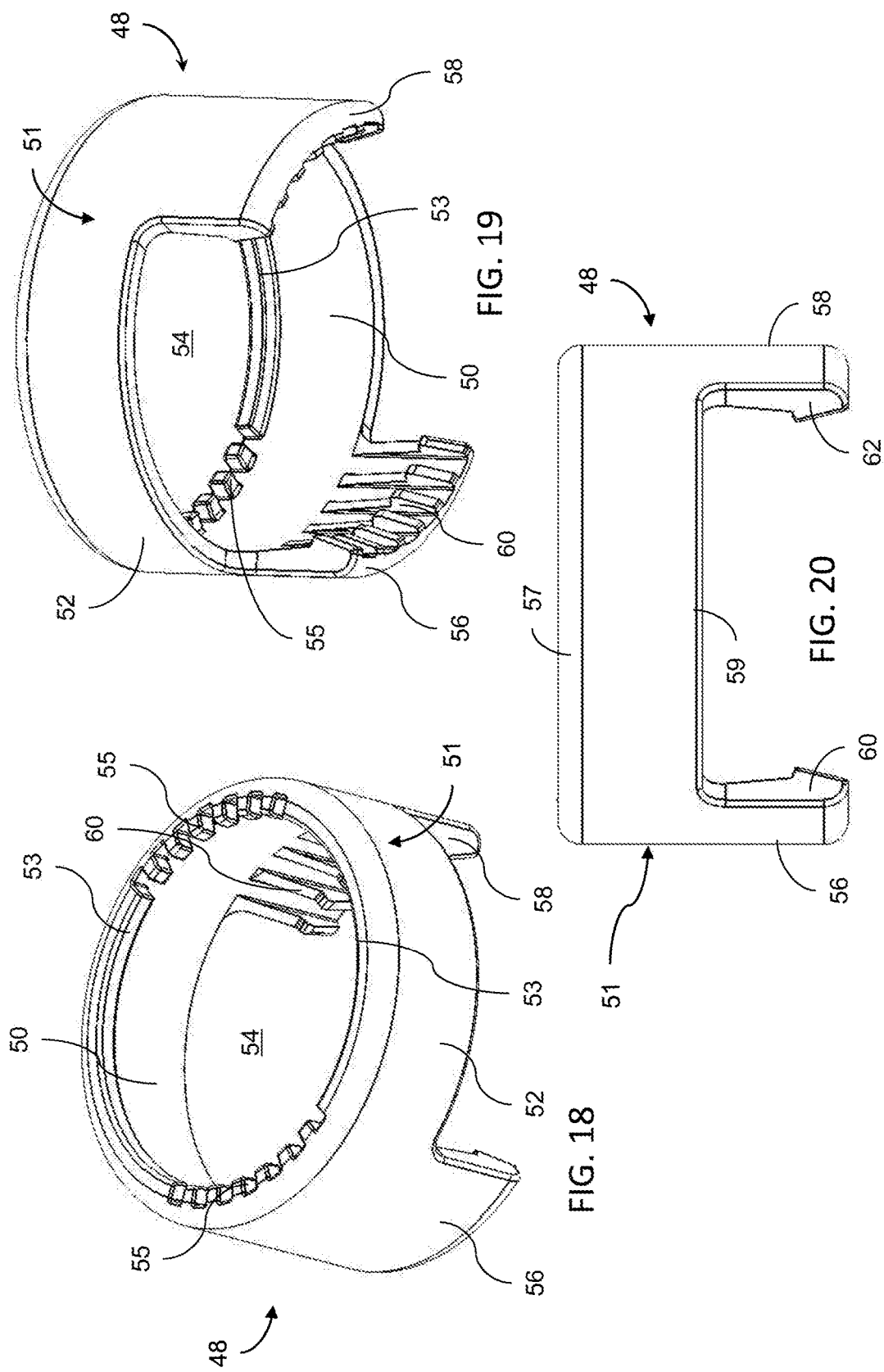

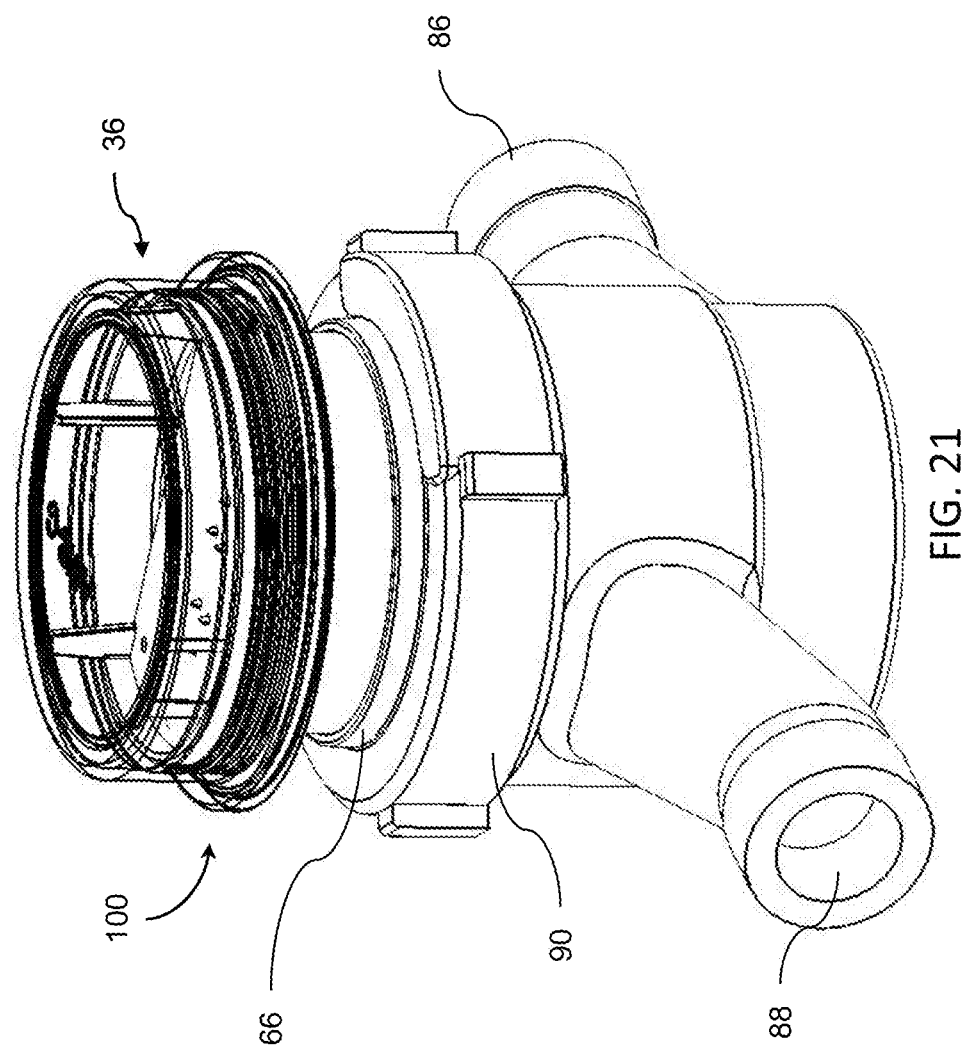

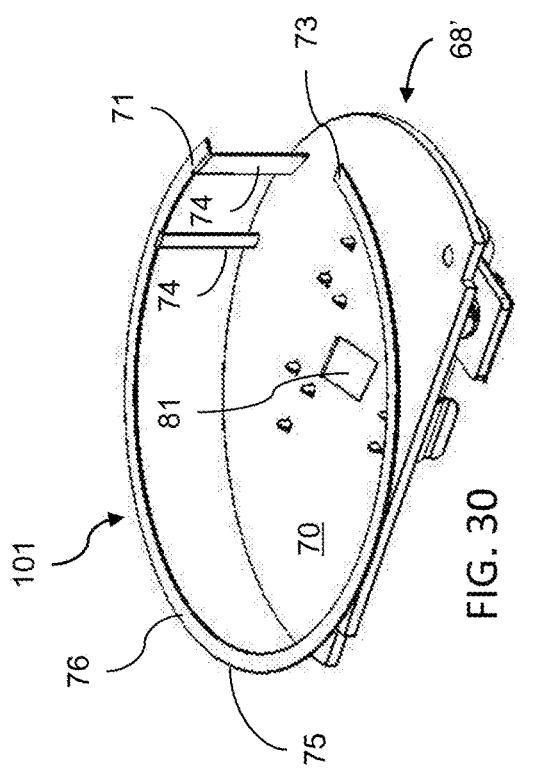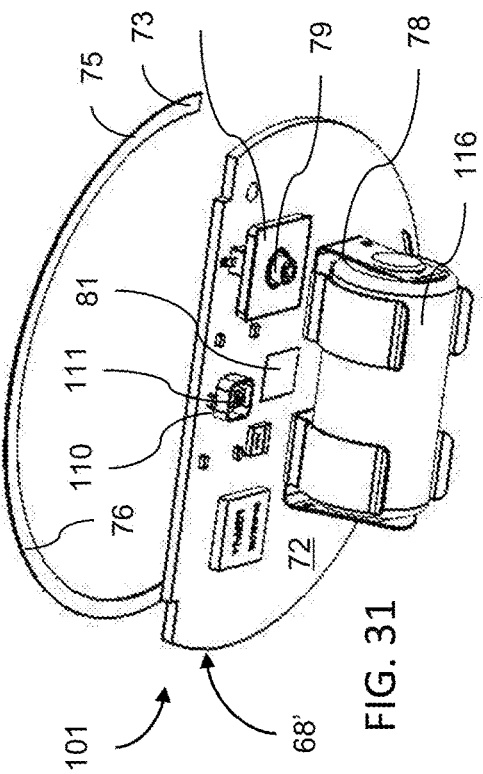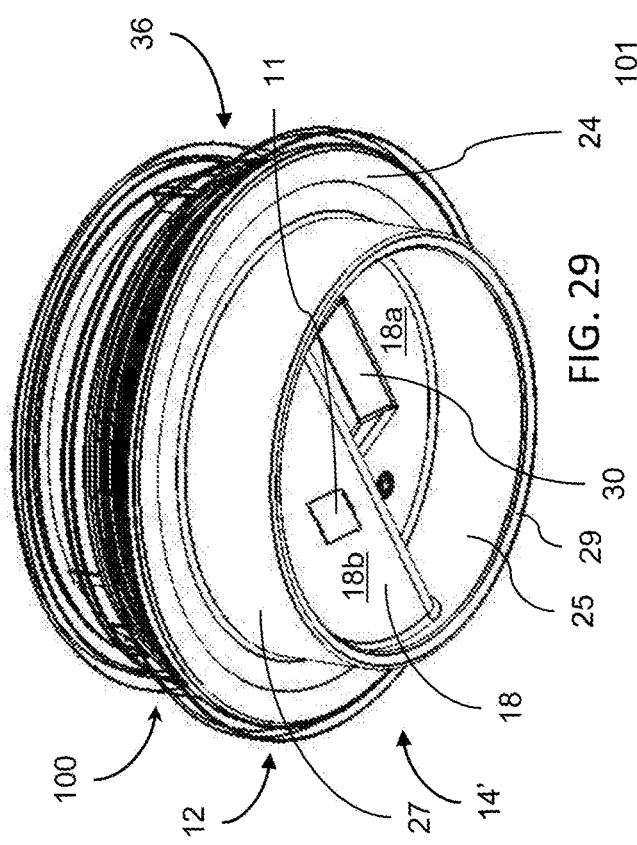

METER READING DEVICE AND SYSTEM

CROSS-REFERENCE TO RELATED APPLICATIONS

This application claims priority from U.S. Provisional Patent Application No. 62/375,914, filed Aug. 17, 2016, whose disclosure is incorporated by reference in its entirety herein.

TECHNICAL FIELD

The present invention relates to meter reader devices and systems.

BACKGROUND OF THE INVENTION

Utility meters, such as, for example, water meters, display information indicative of utility consumption by an end user. High utility consumption results in higher cost to the end user, and the cost to the end user may be increased due of malfunctioning utility meters or utility meter tampering. In addition, malfunctions and utility meter tampering may result in a higher cost burden to the utility provider as well. Efficient near real-time monitoring of the utility meter may be desired in an effort to reduce the cost to the end user and the utility provider.

SUMMARY OF THE INVENTION

The present invention is a meter reading device and system.

According to the teachings of an embodiment of the present invention, there is provided a device for reading a meter. The device comprises: an electronics assembly including an image sensor for capturing an image of a display area of the meter, the image sensor including a lens having a field of view; a housing including a cover coupled to a base member including an aperture, the base member for operatively coupling to a casing of the meter, the electronics assembly being retained between the base member and the cover such that the lens is aligned with the aperture; and a fastening member including a hollow section for receiving a portion of the housing, the fastening member further including a mechanism for attaching the fastening member to a portion of the meter to maintain the display area of the meter in the field of view of the lens.

Optionally, the electronics assembly further includes a processing unit and a communications module, the processing unit for compressing the image captured by the image sensor, and the communications module for transmitting the compressed image to a hub unit over a wireless communication channel.

Optionally, the wireless communication channel is a radio frequency (RF) channel.

Optionally, the device further comprises: an antenna coupled to the communications module, the antenna partially encircling a printed circuit board of the electronics assembly and held in place by engagement of the base member with the cover.

Optionally, the electronics assembly further includes a printed circuit board (PCB), and the image sensor, the processing unit and the communications module are attached to the PCB.

Optionally, the cover is transparent, and the PCB is dimensioned to allow visibility of the display area of the meter, through the cover, when the base member is coupled to the meter.

Optionally, the electronics assembly further includes an illuminator coupled to the image sensor for illuminating the display area of the meter.

Optionally, the electronics assembly further includes an illumination sensor coupled to the illuminator, and an illumination intensity output of the illuminator is adjusted based on output of the illumination sensor.

Optionally, the electronics assembly further includes a tampering sensor arrangement including at least one of a magnetic sensor and an accelerometer.

Optionally, the display area of the meter includes at least one of a first region displaying a numerical meter reading, and a second region displaying an identifier of the meter.

Optionally, the fastening member includes an annular body defined in part by an inner sidewall, an outer sidewall, and the hollow section, and the mechanism includes at least one detent extending away from the annular body for engaging the portion of the meter.

Optionally, the at least one detent is resiliently biased.

There is also provided according to an embodiment of the teachings of the present invention, a system for reading a meter. The system comprises: a remote unit including: an electronics assembly retained in a housing, the electronics assembly including an image sensor for capturing images of a display area of the meter, and a remote unit communications module configured to transmit, over a first communications channel, image data derived from the images captured by the image sensor, and a fastening member for coupling the electronics assembly to a casing of the meter such that a lens of the image sensor is aligned with an aperture of the housing to view the display area of the meter through the aperture; and a hub unit including: a first hub unit communications module configured to receive the transmitted image data from the remote unit communications module over the first communications channel, and a hub unit processing unit including at least one processor coupled to a storage medium configured to: analyze the received image data to extract information from the image data, the information including at least an identifier of the meter and a meter reading of the meter for each of the images captured by the image sensor.

Optionally, the hub unit further comprises a second hub unit communications module, and the system further comprises: a remote server for receiving data from the hub unit, the second hub unit communications module is configured to transmit data to the remote server over a second communications channel. the hub unit processing unit is further configured to: actuate the second hub unit communications module to transmit the extracted information to the remote server, and the remote server is configured to compare the identifier of each received image with a stored identifier associating the remote unit with the meter.

Optionally, the second hub unit communications module is further configured to receive data from the remote server over the second communications channel, the received data including a programmable transmit and receive schedule for the remote unit communications module, and the first hub unit communications module is further configured to transmit the programmable transmit and receive schedule to the remote unit communications module, and the hub processing unit is further configured to: actuate the remote unit communications module to operate according to the programmable transmit and receive schedule.

Optionally, the second hub unit communications module is further configured to receive a request from the remote server over the second communications channel, and the hub processing unit is further configured to: actuate the remote unit communications module to transmit an image captured by the image sensor to the first hub unit communications module in response to the request.

Optionally, the first communications channel is a radio frequency (RF) channel, and the second communications channel is a broadband communications channel.

Optionally, the electronics assembly further includes a remote unit processing unit including at least one processor coupled to a storage medium, the remote unit processing unit configured to derive the image data by compressing the images captured by the image sensor.

Optionally, the hub unit processing unit is further configured to: decompress the image data compressed by the remote unit processing unit.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 1 is an isometric view of a remote unit, constructed and operative according to an embodiment of the present invention, taken from above the remote unit;

FIG. 2 is an isometric view of the remote unit corresponding to FIG. 1, taken from below the remote unit;

FIG. 3 is a bottom view of the remote unit corresponding to FIG. 2;

FIG. 5 is an isometric view of a base member of the remote unit of FIGS. 1-4, taken from above the base member;

FIGS. 6 and 7 is are top and side views, respectively, of the base member of the remote unit corresponding to FIG. 5;

FIG. 8 is an isometric view of a cover of the remote unit of FIGS. 1-4, taken from below the cover;

FIGS. 9 and 10 are isometric views of an electronics assembly of the remote unit of FIGS. 1-4, taken from above and below the electronics assembly, respectively;

FIG. 11 is an isometric view similar to FIG. 1, with the cover removed;

FIG. 12 is a top view corresponding to FIG. 11;

FIG. 17 is a cross-sectional view of fastening member coupling the remote unit coupled to the utility meter corresponding to FIG. 13;

FIGS. 18 and 19 are isometric views of the fastening member, taken from above and below the fastening member, respectively;

FIG. 20 is a side view of the fastening member corresponding to FIGS. 18 and 19;

FIG. 21 is an isometric view similar to FIG. 13, with the fastening member removed;

FIG. 29 is an isometric view of the remote unit having an alternative embodiment of a base member, taken from below the remote unit;

FIGS. 30 and 31 are isometric views of an alternative embodiment of an electronics assembly, taken from above and below the electronics assembly, respectively;

DESCRIPTION OF THE PREFERRED EMBODIMENTS

Figure 4:
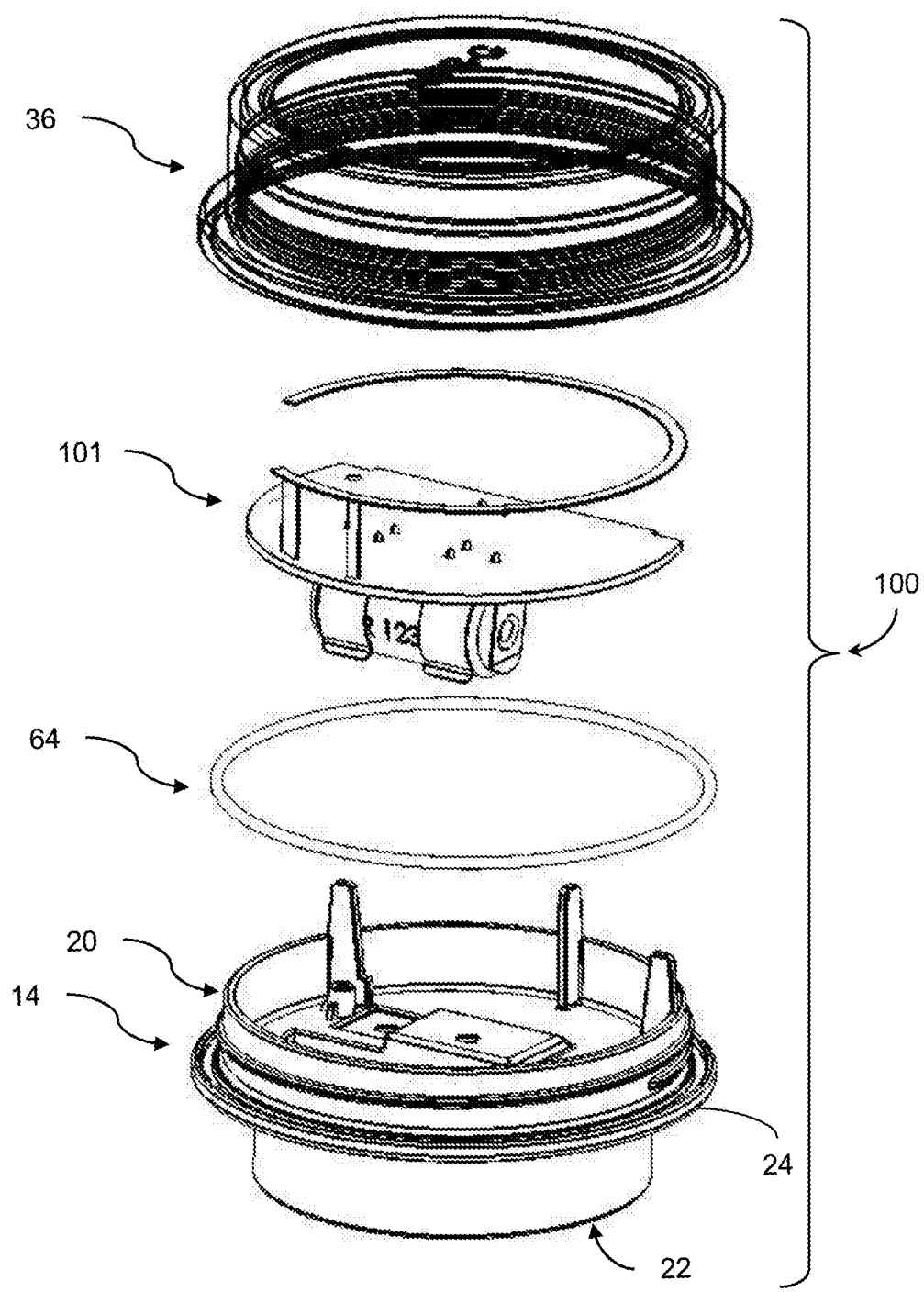
FIG. 4 is an isometric exploded view illustrating the components of the remote unit of FIGS. 1-3.

The present invention is a meter reader device and system.

The principles and operation of the device and system according to the present invention may be better understood with reference to the drawings and accompanying description.

The present invention is applicable to situations in which operators and end users wish to receive analytical data derived from sensor data which monitors devices used by the end user, either directly or indirectly, and is of particular value when applied to reading data from a utility meter, such as, for example, a water meter, gas meter, or electric meter. The potential application of the present invention should not be limited to the applications used for the purposes of illustrating the principles and operation of the device and system according to the present invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, upper and lower, top and bottom, upward and downward, inner and outer, inward and outward and the like. These directional references are exemplary only to illustrate the invention and embodiments thereof.

Referring now to the drawings, FIGS. 1-23 illustrate a device, generally designated 10, and corresponding components of the device 10, constructed and operative according to an embodiment of the present invention, for mounting to, and capturing information displayed on, a utility meter 80, and for sending the captured information and information related to the utility meter 80 and the device 10 to a location remote from the device 10.

In the non-limiting example of the utility meter 80 illustrated in the drawings, the utility meter 80 is portrayed as a water meter, such as a water meter produced by Arad Group Integrated Metering Technologies of Dalia, Israel. The water meter may be a hot water meter or a cold water meter (or a combination thereof), and measures water flow and/or water consumption. In order to better explain the principles and operation of the device 10, throughout the remainder of the present disclosure the utility meter 80 will be described within the context of a water meter. However, the device 10 of the present disclosure is operative to mount to various types of utility meters of disparate dimensions. The illustration and description of the utility meter 80 as a water meter is for example purposes only, and should not limit the applications of the device 10 of the present disclosure to non-water based applications.

Figure 32:
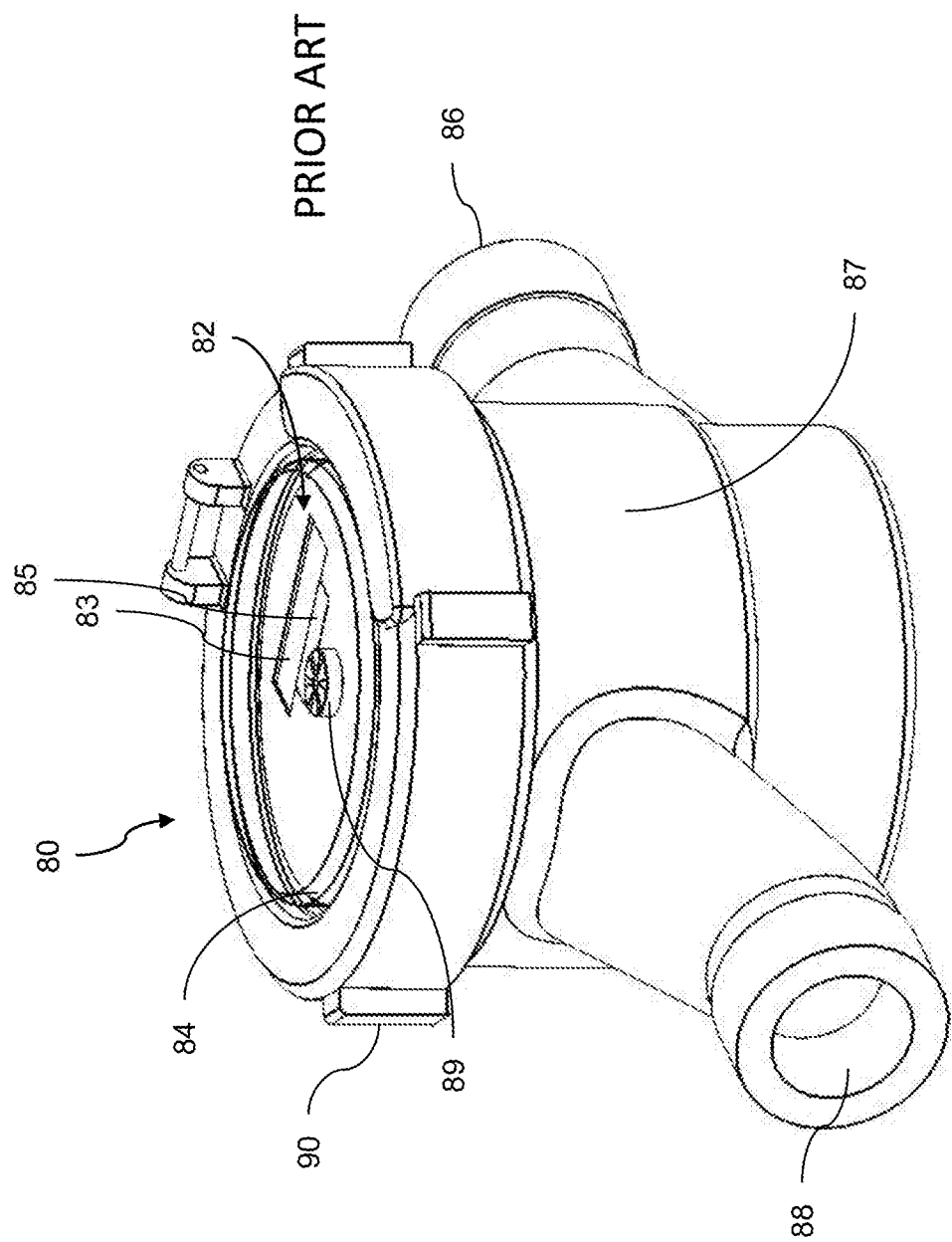
FIG. 32 is an isometric view of a prior art utility meter with which the remote unit can be used.
Figure 33:
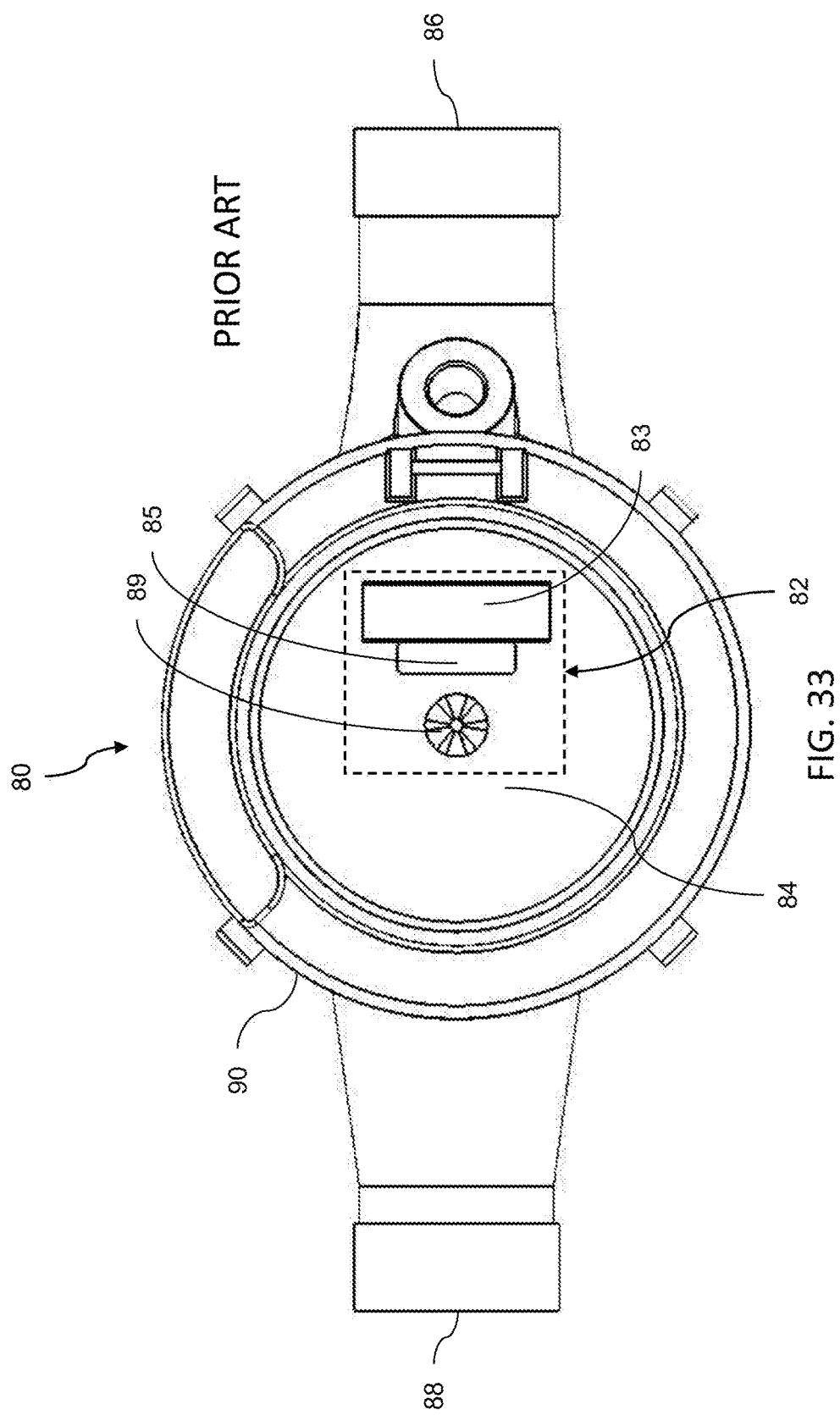
FIG. 33 is a top view corresponding to FIG. 32.

The utility meter 80 is typically deployed in a location in which access to the utility commodity (e.g., water) is required, including, but not limited to, residential locations, such as, for example, houses and apartments of an apartment building, and commercial locations, such as, for example, office buildings and stores. With particular reference to FIGS. 32 and 33, the utility meter 80 includes an inlet section 86 and an outlet section 88, allowing for the flow of water therebetween. When a water consuming device (e.g., toilets, sinks, showers, dishwashers, washing machines, irrigation systems, etc.) is operated, water flows from a water source (typically provided by a water authority) into the inlet section 86 and across a central portion 87 of the utility meter 80 to the outlet section 88, which connects to the water consuming device through a piping arrangement (not shown). The central portion 87 typically includes components, such as, for example, sensors and the like, for measuring the rate of flow of the water between the inlet section 86 and the outlet section 88. The flow and/or consumption is typically displayed on a region of a display area 82 of the utility meter 80, that is covered by a transparent display cover 84, and fastened to the utility meter 80 by a locking mechanism 90. For example, the flow of water causes a disc or wheel 89, deployed on a region of the display area 82, to spin. The spinning indicates the consumption of water to a user viewing the utility meter 80. The flow and/or consumption information, in the form of a numerical reading, is typically displayed in a first region 83 of the display area 82, and utility meter identification information (e.g., a serial number) is typically displayed in a second region 85 of the display area 82.

With continued reference to FIGS. 1-23, the device 10 includes a remote unit 100 and a fastening member 48 for affixing or mounting the remote unit 100 to the utility meter 80. The remote unit 100 includes an electronics assembly 101 and a housing 12 for retaining the electronics assembly 101 therein. The electronics assembly 101 includes several electronic and sensor components, and is operative to capture images of the display area 82 of the utility meter 80, and transmit those images to one or more devices remotely located from the remote unit 100, as will be described in detail in subsequent sections of the present disclosure.

The housing 12 is formed by a base member 14 and a cover 36. The components of the housing 12 are preferably constructed from a durable material that limits the amount of moisture, humidity, and contaminants entering the internal portion of the housing 12. Most preferably, the base member 14 and the cover 36 are moisture and humidity proof. The moisture and humidity limiting features prevent water induced damage to the components of the electronics assembly 101, and further prevent condensation from forming on the display cover 84 of the utility meter 80, which is typically made of a transparent material, such as, for example, glass. The remote unit 100 is protected according to leading industry standards, including, but not limited to, the IP65 standard for enclosures. As such, the remote unit 100 is protected from dust, debris, moisture, and other potentially harmful objects which may damage the electronic components of the remote unit 100.

With particular reference to FIGS. 1-7, the base member 14 is generally round in shape, and includes an upper portion 20 and a lower portion 22 that are separated by a central section 19. The central section includes a top surface 16 and a bottom surface 18. The upper portion 20 is a generally circular flange that extends upward from the top surface 16. The lower portion 22 is a generally circular flange that extends downward from the bottom surface 18. The diameter of the upper portion 20 is greater than the diameter of the lower portion 22. The combination of the upper portion 20 and the central section 19 results in a general cup shaped portion. The combination of the lower portion 22 and the central section 19 results in a separate general cup shaped portion. The general cup shaped portions are inverted with respect to each other.

The central section 19 is formed of a contoured surface, resulting in the aforementioned cup shaped portions of the base member 14 being of varying depth. When viewed in the cross-section, for example as shown in FIG. 17, the change in contour of the central section 19 forms a step 17. The contoured feature of the central section 19 partitions the top surface 16 into two subsurfaces, namely an upper subsurface 16a and a lower subsurface 16b. Similarly, the contoured feature of the central section 19 partitions the bottom surface 18 into two subsurfaces, namely an upper subsurface 18a and a lower subsurface 18b. The subsurfaces 16a and 18a are generally opposite from each other, while the subsurfaces 16b and 18b are generally opposite form each other.

The contoured feature of the central section 19 creates a well 26 formed in part by the lower subsurface 16b of the central section 19. The well 26 is semicircular in shape and is dimensioned to receive one or more of the components of the electronics assembly 101, as will be described in subsequent sections of the present disclosure.

The central section 19 is opaque and includes a window 30, in the form of a cutout section of the upper subsurfaces 16a and 18a. The window 30 extends from one side of the central section 19 to the other side of the central section 19 (i.e., extends from the upper subsurface 16a to the upper subsurface 18a), allowing unimpeded visibility therethrough. The window 30 is positioned at an angle relative to the upper subsurface 16a. The central section 19 also includes an aperture 34, separate from the window 30. The aperture 34 extends from one side of the central section 19 to the other side of the central section 19 (i.e., extends from the upper subsurface 16a to the upper subsurface 18a), allowing unimpeded visibility therethrough. The aperture 34 and the window 30 are positioned in an elevated portion 35 of the upper subsurface 16a.

In certain embodiments, the central section 19 also includes a generally square shaped depression 31 in the upper subsurface 16a. An aperture 33 is centrally positioned in the depression 31 and extends from one side of the central section 19 to the other side of the central section 19 (i.e., extends from the upper subsurface 16a to the upper subsurface 18a). In an alternative embodiment, the lower subsurfaces 16b and 18b are absent and are replaced by a cutout section of the top surface 16 and the bottom surface 18.

The flange which forms the upper portion 20 includes an inner sidewall 21 and an outer sidewall 23. The inner sidewall 21 defines a perimeter inside of which three posts 28 are positioned. The posts 28 are generally upright vertical members that are connected to the upper subsurface 16a and the inner sidewall 21, and extend upward away from the top surface 16. The posts 28 are deployed at relatively even spacing along approximately half of the inner sidewall 21. The outer sidewall 23 includes threading 32 to facilitate engagement between the base member 14 and the cover 36.

Figure 15:
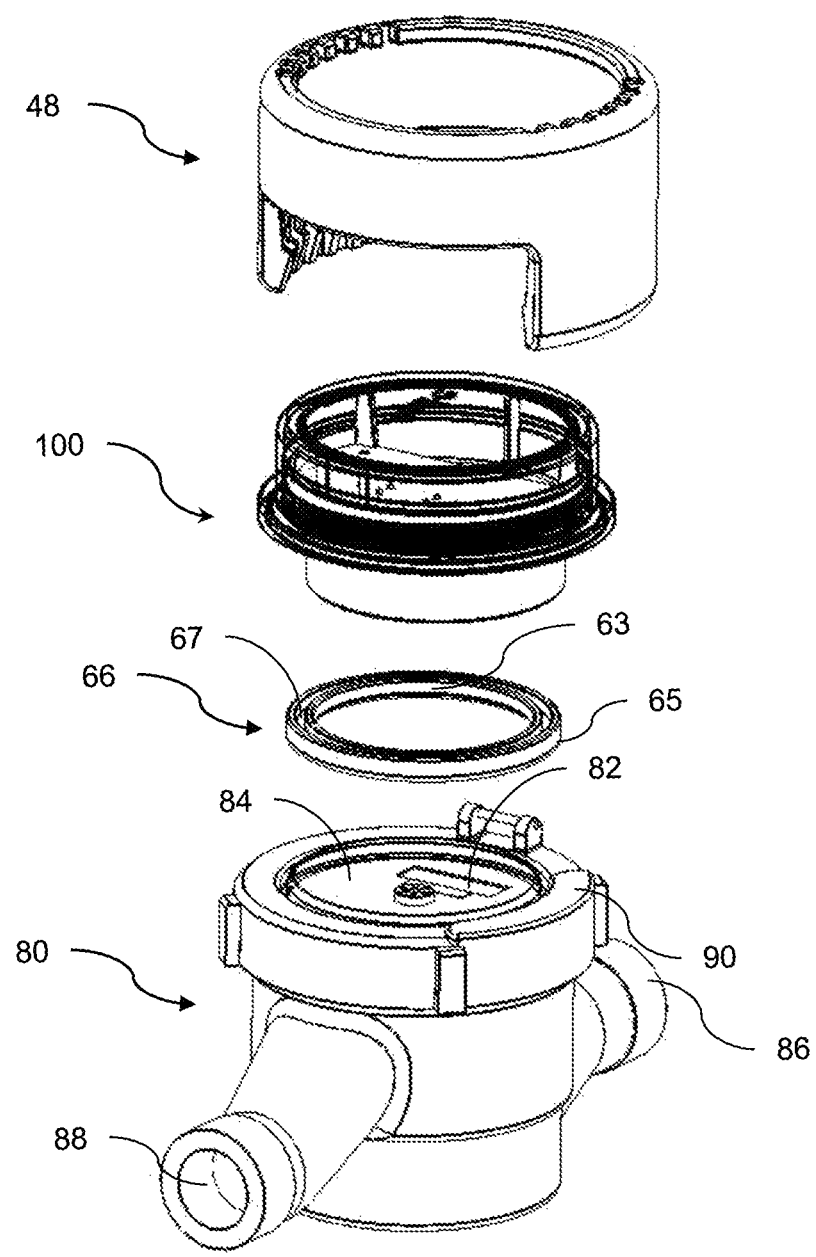
FIG. 15 is an isometric exploded view illustrating the components of FIG. 13.

The flange which forms the lower portion 22 includes an inner sidewall 25 and an outer sidewall 27. A bottom edge 29 is formed at the bottom of the lower portion 22. The edge 29 is annular in shape, and is dimensioned to contact, either directly or indirectly, the display cover 84 of the utility meter 80. As shown in FIG. 15, an annular gasket 66 of similar diameter to the lower portion 22 is preferably positioned between the edge 29 and the display cover 84, facilitating the sealed coupling of the remote unit 100 to the utility meter 80. The gasket 66 preferably includes concentric inner 63 and outer 65 portions that define an annular cavity 67. The dimensions of the cavity 67 and the edge 29 are correspondingly configured such that the edge 29 sits in the cavity 67.

An annular collar 24 extends outward from the base member 14, and is positioned below the threading 32. The annular collar 24 is positioned at approximately the center height of the base member 14, between the upper portion 20 and the lower portion 22. The diameter of the collar 24 is greater than the diameters of both the upper portion 20 and the lower portion 22.

With particular reference to FIG. 8, the cover 36 is generally cap shaped and includes a planar top portion 40, an annular inner sidewall 42, and an annular outer sidewall 44. The cover 36 is transparent and is constructed from a material, such as, for example, moisture and water-resistant plastic. The transparent characteristic of the cover 36 allows unimpeded visibility through the cover 36. The planar top portion 40 is joined to the sidewalls 42 and 44 at the top of the sidewalls, resulting in a domed structure. As mentioned above, engagement between the base member 14 and the cover 36 is facilitated by the threading 32 deployed on the outer sidewall 23. A lower portion of the inner sidewall 42 includes threading 46 that is configured to correspondingly engage with the threading 32 of the base member 14, so as to allow engagement of the base member 14 and the cover 36 via central axis rotation of the cover 36. In a non-limiting implementation, the threading 32 of the base member 14 is implemented as a male thread, with the threading 46 of the cover 36 implemented as a female thread.

A lower portion of the outer sidewall 44 includes an annular collar 38 that extends outward from the cover 36. The diameter of the collar 38 of the cover 36 is greater than the dimeter of the collar 24 of the base member 14. The collar 38 of the cover 36 envelopes the collar 24 of the base member 14 when the base member 14 and the cover 36 are engaged. An annular gasket 64, as illustrated in FIG. 4, is positioned between the annular collar 24 of the base member 14 and the collar 38 of the cover 36, providing an additional seal between the base member 14 and the cover 36.

With continued reference to FIGS. 1-8, refer now to FIGS. 9-12, the electronics assembly 101. The electronics assembly 101 is retained in the housing 12 defined by the base member 14 and the cover 36, and includes a printed circuit board (PCB) 68 that includes a top surface 70 and a bottom surface 72. As mentioned above, the electronics assembly 101 includes components, the majority of which are connected to the bottom surface 72, for performing a variety of functions, including capturing images of the display area 82 of the utility meter 80, and transmitting those images to one or more devices remotely located from the remote unit 100. The image capture is performed by an image sensor 110 having a lens 111, that is connected to the bottom surface 72 of the PCB 68. The image sensor 110 is operative to capture images of scenes in the field of view of the lens 111. The image sensor 110 may be implemented as a CMOS camera, and is preferably implemented as a color CMOS camera, such as, for example, VGA CMOS, QVGA CMOS, QQVGA CMOS, and the like.

The PCB 68 has the general shape of a majority segment of a circle. The electronics assembly 101 is positioned in the housing 12 such that a majority portion of the bottom surface 72 of the PCB 68 is positioned over the well 26 of the base member 14, with the remaining portions of the bottom surface 72 being positioned along a center strip of the upper subsurface 16a of the base member 14. The aperture 34 is positioned in the elevated portion 35, that is in the center strip of the upper subsurface 16a, and the lens 111 of the image sensor 110 is positioned directly over the aperture 34, such that the optical axis of the lens 111 is aligned with the aperture 34. The alignment of the lens 111 and the aperture 34 allows the image sensor 110 to capture images of objects positioned on the other side of the top surface 16.

The circle segment shaped PCB 68 is dimensioned small enough to prevent obstruction of the window 30. As a result, objects positioned on the other side of the top surface 16 are visible to the human eye, and can be viewed through the transparent cover 36 and the window 30.

Referring to FIGS. 29-31, alternative embodiments of a PCB 68' and a base member 14'. The PCB 68' is similar to the PCB 68 except that the PCB 68' also includes a cutout portion 81 extending between the top surface 70 and the bottom surface 72. The base member 14' is similar to the base member 14 except that the lower subsurface 18b of the base member 14' includes a cutout portion 11, similarly dimensioned to the cutout portion 81, allowing visibility of the disc or wheel 89, through the cutouts in the PCB 68' and lower subsurface 18b, when the remote unit 100 is mounted to the utility meter 80.

Figure 16:
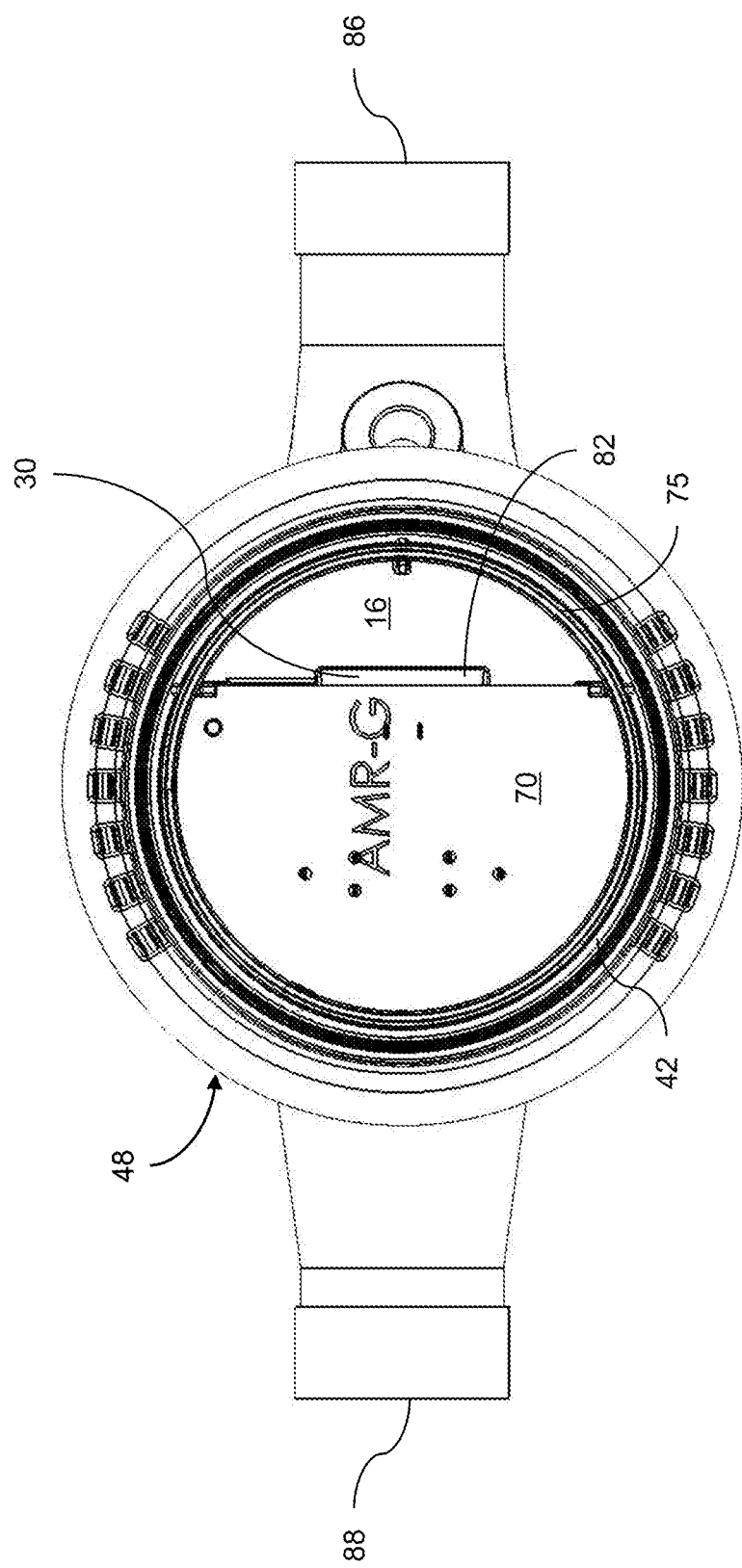
FIG. 16 is a top view of the fastening member coupling the remote unit to the utility meter corresponding to FIG. 13.
Figure 22:
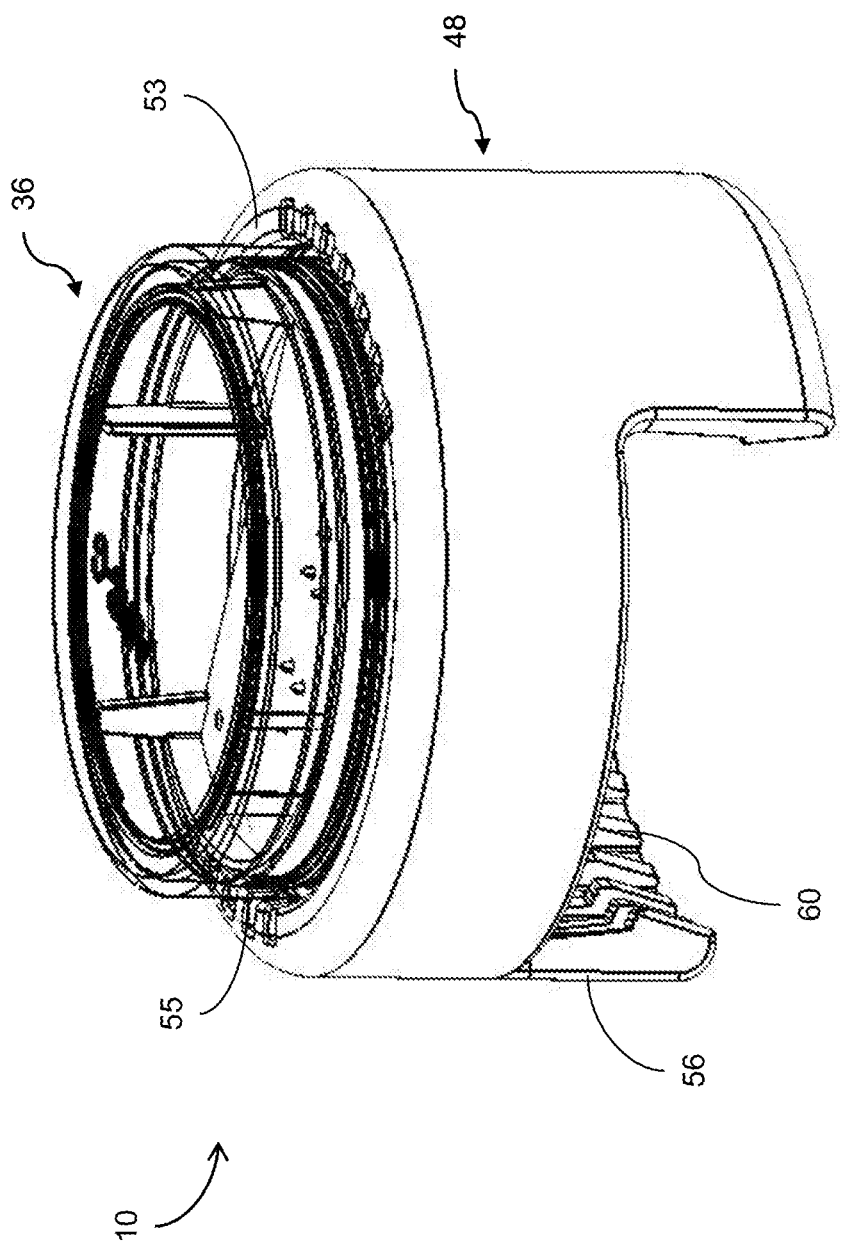
FIG. 22 is an isometric view similar to FIG. 13, with the utility meter removed, illustrating the remote unit seated in the fastening member, taken from above the remote unit.
Figure 23:
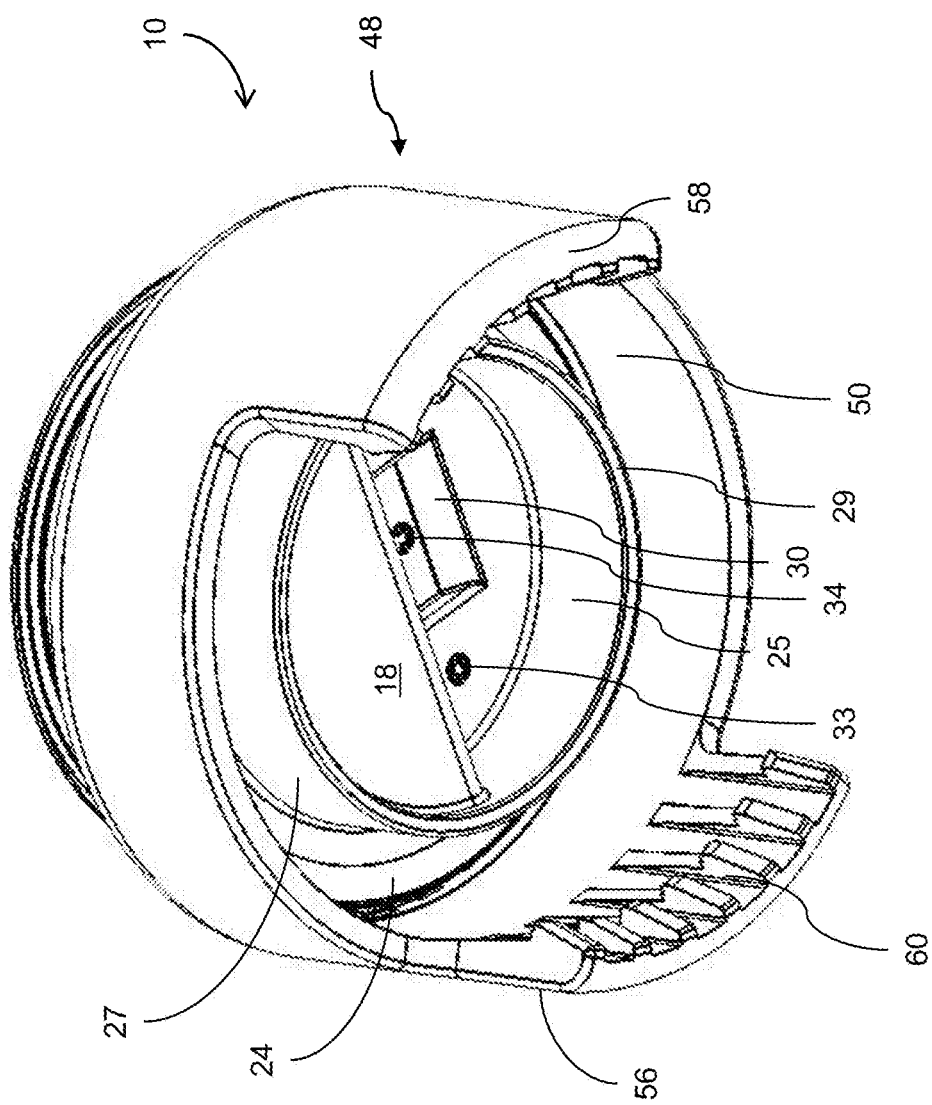
FIG. 23 is an isometric view corresponding to FIG. 22, taken from below the remote unit.

The electronic assembly 101 also includes a curved antenna 76 for propagating signals generated by components of the electronics assembly, and receiving signals transmitted by devices remotely located from the remote unit 100. The antenna 76 includes a first end 71 and a second end 73. The antenna 76 is connected to the top surface 70 of the PCB 68 via two connector posts 74 that are electronically coupled to portions of the antenna 76 near the first end 71. The two connector posts 74 are closely spaced, and are connected to the top surface 72 near a central portion of the curved edge of the PCB 68. The connector posts 74 are made from a conductive material to allow the transfer of energy between the antenna 76 and communications hardware components of the electronics assembly 101. In the non-limiting illustration of the antenna 76 illustrated in FIGS. 9-12, the antenna 76 is implemented as a thin strip of curved metal that traces the majority of the circumference of a circle, such that the ends 71 and 73 are proximate to each other, and the antenna 76 partially encircles the PCB 68. Portions of the antenna 76 rest on the posts 28 of the base member 14. The posts 28 provide support to the antenna 76 and prevent collapse of the antenna 76. In addition, portions of an outer edge 75 of the antenna 76 are at a near abutment with portions of the inner sidewall 42 of the cover 36, as shown in FIG. 16. As such, the antenna 76 is held in place by the engagement of the base member 14 with the cover 36.

A power supply 116 is mounted to the bottom surface 72 via a connector assembly 78 that connects the power supply 116 to the PCB 68. The power supply 116 supplies power to the image sensor 110 and other electronic components of the remote unit 100, as will be described in subsequent sections of the present disclosure. In a non-limiting implementation, the power supply 116 is implemented as a battery, as illustrated in FIGS. 9-12, for example a lithium or lithium-ion battery. When implemented as a battery, the power supply 116 is preferably capable of providing a direct current (DC) voltage in the range of 3-3.6 volts, and preferably has a capacity in the range of 700-1500 milliampere hours (mAh). Such batteries are commercially available as CR123A batteries, and may be rechargeable or non-rechargeable. The well 26 is dimensioned with a depth to receive the power supply 116 therein, and includes a curved support member 39 for supporting the bottom portion of the power supply 116.

According to certain embodiments, the PCB 68 may include reset switch circuitry 77 coupled to a reset switch 79 for actuating the reset switch circuitry 77. The reset switch circuitry 77 is mounted to the bottom surface 72 and is electronically coupled to the power supply 116 and other components of the electronics assembly 101 for providing a reset command to the electronics assembly 101. The reset switch circuitry 77 is dimensioned to be received in the depression 31 formed in the central section 19 of the base member 14. The reset switch 79 is dimensioned to be received in the aperture 33.

Referring now to FIGS. 13-20, 22 and 23, the fastening member 48 includes components and structure for mounting the remote unit 100 to the utility meter 80. The fastening member 48 is used to attach the remote unit 100 to the utility meter 80 and retain the remote unit 100 in a fixed position when attached to the utility meter 80.

The fastening member 48 includes an annular body 51 defined by an inner sidewall 50 and an outer sidewall 52, and a hollow section 54 extending between the top 57 and bottom 59 of the annular body 51. A pair of inward protruding ridges 53 are diametrically disposed at the top 57 of the annular body 51 and extend inward toward the hollow section 54. A pair of inwardly protruding ridge segments 55 are diametrically disposed at top 57 of the annular body 51 and extend inward toward the hollow section 54. The ridge segments 55 are rotationally offset from the ridges 53.

The hollow section 54 and the cover 36 are correspondingly dimensioned, allowing the planar top portion 40 of the cover 36 to pass through the hollow section 54. In other words, the diameter of the inner sidewall 50 is slightly larger than the dimeter of the cover 36. The ridges 53 and ridge segments 55 engage the collar 38 of the cover 36, preventing the cover 36, and therefore the remote unit 100, from passing all the way through the hollow section 54.

The fastening member 48 includes a mechanism for attaching the fastening member 48 to the utility meter 80. The mechanism includes two downward projecting flanges, namely a first flange 56 and a second flange 58. The first flange 56 extends downward from a portion of the bottom 59 of the annular body 51, and extends an arc length across an arcuate segment of the annular body 51 approximately equal to the arc length over which one of the ridge segments 55 extends. The second flange 58 extends downward from a portion of the bottom 59 of the annular body 51 that is generally diametrically disposed from the portion of the bottom 59 from which the first flange 56 extends. Similar to the first flange 56, the second flange 58 extends an arc length across an arcuate segment of the annular body 51 approximately equal to the arc length over which the other one of the ridge segments 55 extends.

Figure 13:
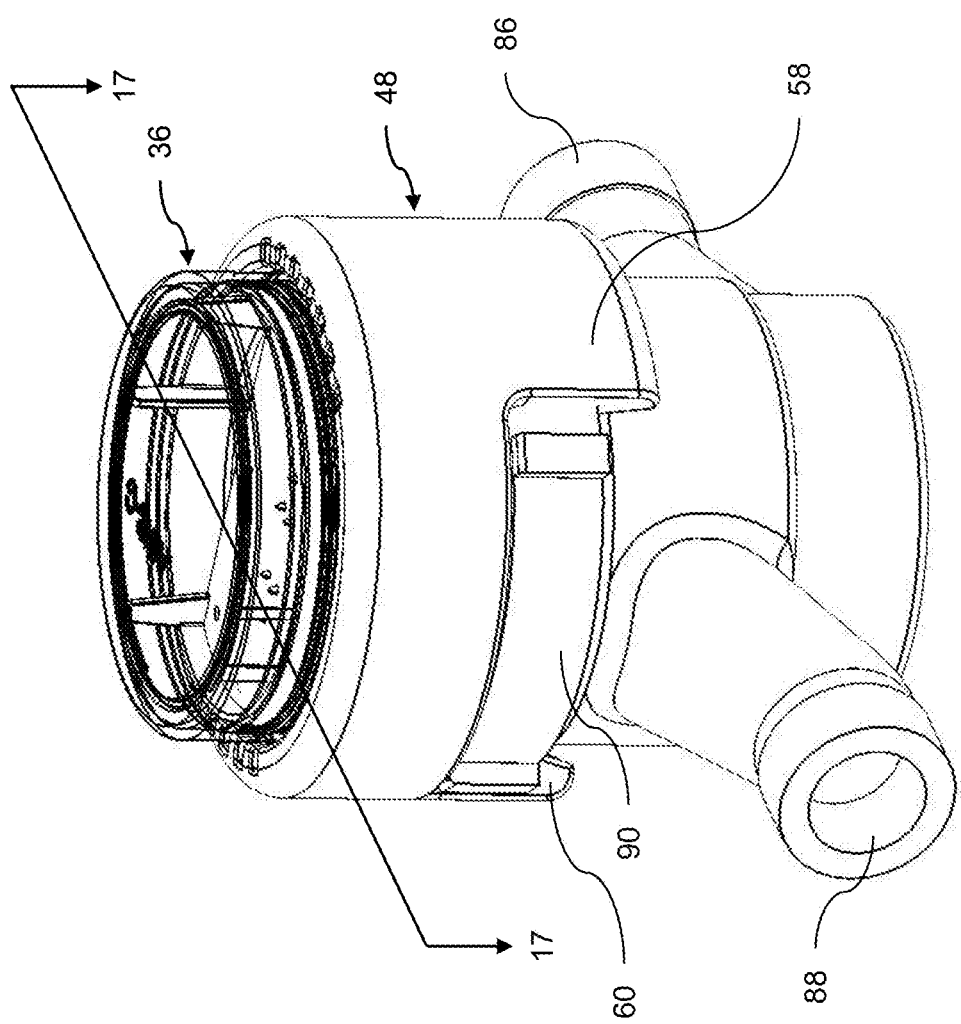
FIG. 13 is an isometric view of the remote unit of FIGS. 1-4 seated on a utility meter and coupled to the utility meter via a fastening member.
Figure 14:
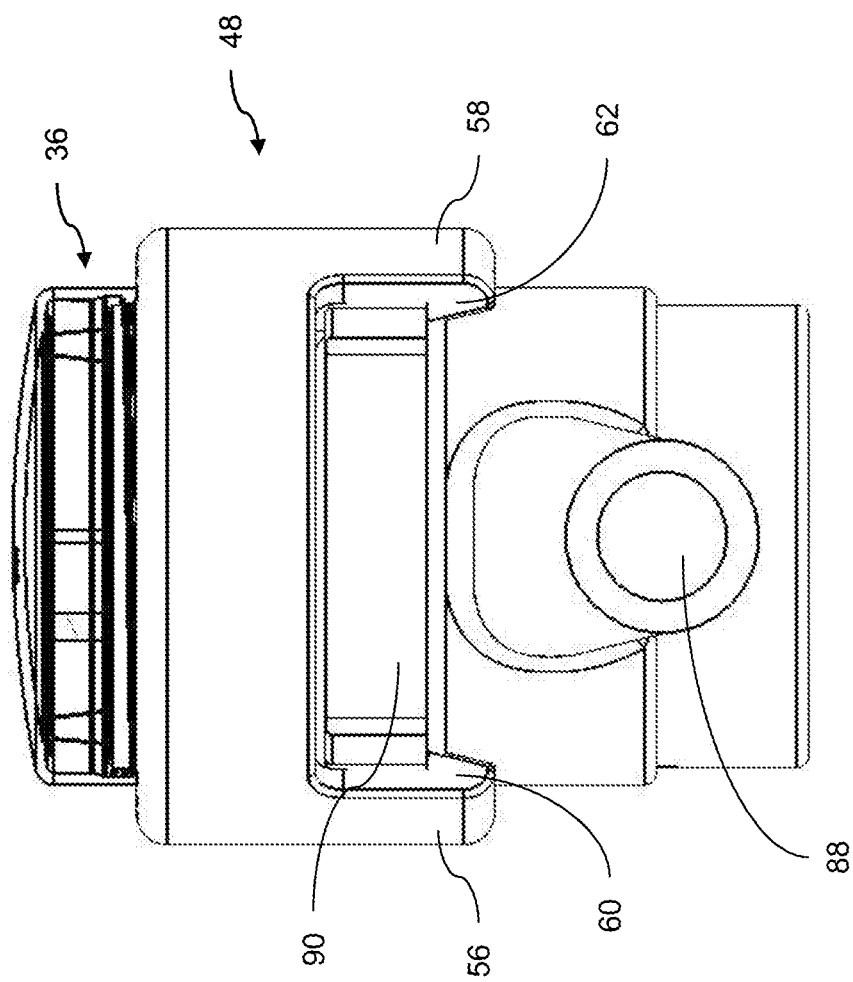
FIG. 14 is a front view corresponding to FIG. 13.

Each of the flanges 56 and 58 includes a respective set of resiliently biased detents. Specifically, the first flange 56 includes a first set of detents 60, and the second flange 58 includes a second set of detents 62. The detents 60 and 62 are operative to engage regions of a portion of the utility meter 80, specifically regions of the locking mechanism 90 of the utility meter 90, as illustrated in FIGS. 13 and 14.

To mount the remote unit 100 to the utility meter 80, an operator may first seat the remote unit 100 on the display cover 84 of the utility meter 80 to align the housing 12 with the display cover 84. The alignment may be facilitated by inserting the edge 29 of the base member 14 in the cavity 67 of the gasket 66, and positioning the gasket 66 on the display cover 84. The fastening member 48 may then be positioned to partially encapsulate the remote unit 100, such that the planar top portion 40 of the cover 36 passes through the hollow section 54. The detents 60 and 62 of the fastening member 48 are engaged with the locking mechanism 90 by applying a downward force on the top 57 of the annular body 51 of the fastening member 48. To ease the engagement of the detents 60 and 62 with the locking mechanism 90, the detents 60 and 62 may simultaneously be pulled outward while applying the downward force on the annular body 51. Note that alternatively, the remote unit 100 may be mounted to the utility meter 80 by first seating the remote unit 100 in the fastening member 48, and subsequently applying the above described steps to engage the detents 60 and 62 with the locking mechanism 90.

When the remote unit 100 is mounted to the utility meter 90, the lens 111 is aligned with the aperture 34 and the housing 12 is aligned with the display cover 84. The display area 82 is positioned in the field of view of the lens 111 due to the aforementioned alignment, and is maintained in the field of view by the fastening member 48. The aforementioned alignment provides the lens 111 with a clear view to the display area 82 through the aperture 34. In addition, a user or operator of the remote unit 100 has a clear view of the display area 82, due to the cover 36 being positioned over the window 30, which is aligned with the display area 82.

In embodiments in which the PCB 68 and lower subsurface 18b include cutout portions allowing visibility of the disc or wheel 89, through the cutouts in the PCB 68 and lower subsurface 18b, the disc or wheel 89 is also positioned within the field of view of the lens 111. As such, the image sensor 110 may capture images that include the rotational position of the spinning disc or wheel 89.

To remove the remote unit 100 from the utility meter 80, the detents 60 and 62 are pulled laterally outward away from the hollow section 54 to release the engagement of the fastening member 48 with the locking mechanism 90. The remote unit 100 and the fastening member 48 may then be lifted away from the utility meter 80.

The following paragraphs describe the electronic and sensor components of the remote unit 100, the operations for capturing images of the display area 82 when the remote unit 100 is mounted to the utility meter 80, and the operations for transmitting and receiving data and information to and from the remote unit 100.

Figure 24:
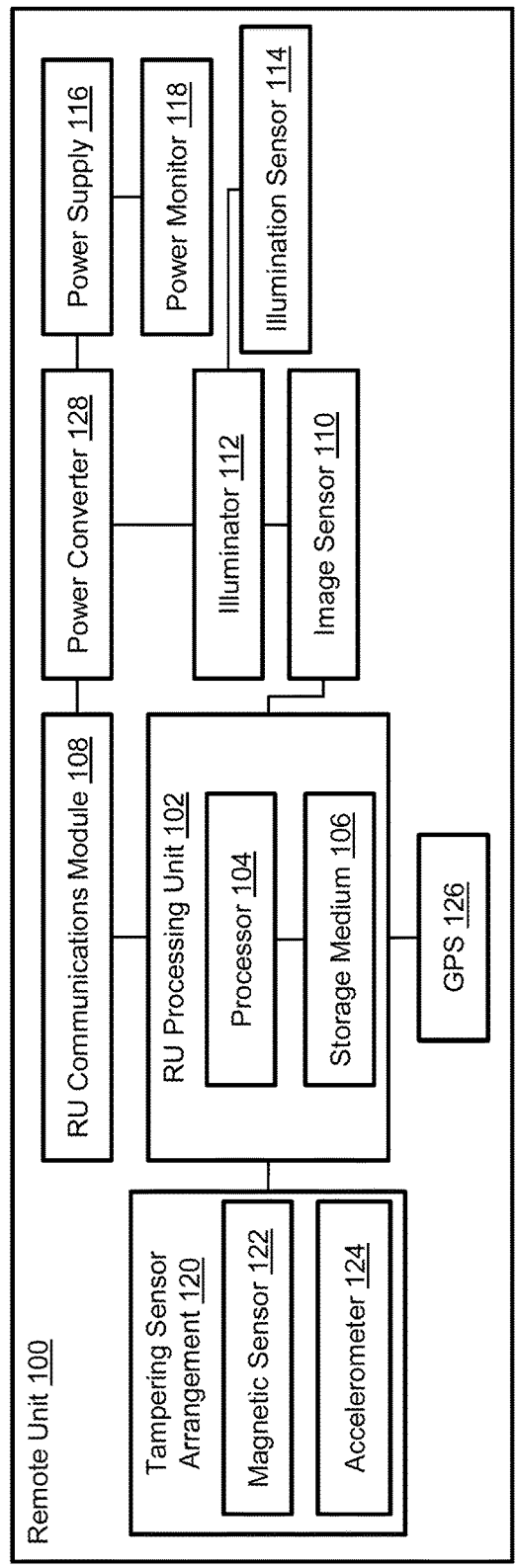
FIG. 24 is a block diagram of components of the remote unit.

With continued reference to FIGS. 1-23, refer now to FIG. 24, a block diagram of the electronic and sensor components of the remote unit 100. The majority of the components illustrated in FIG. 24 are connected to the PCB 68, which provides a direct or indirect connection or link between all of the electronic and sensor components of the remote unit 100.

As discussed above, the remote unit 100 includes an image sensor 110 for capturing images of the display area 82 of the utility meter 80. The image sensor 110 is coupled to a remote unit processing unit 102, referred to hereinafter as the RU processing unit 102, that includes at least one processor 104 coupled to a storage medium 106 such as a memory or the like. The processor 104 can be any number of computer processors, including, but not limited to, a microcontroller, a microprocessor, an ASIC, a DSP, and a state machine. Such processors include, or may be in communication with computer readable media, which stores program code or instruction sets that, when executed by the processor, cause the processor to perform actions. Types of computer readable media include, but are not limited to, electronic, optical, magnetic, or other storage or transmission devices capable of providing a processor with computer readable instructions.

The RU processing unit 102 actuates the image sensor 110 to capture images of the display area 82. The captured images include the flow and/or consumption information, referred to interchangeably as a "meter reading", displayed on the first region 83 of the display area 82, and the identification information of the utility meter 80 displayed in the second region 85 of the display area 82.

An illuminator 112 for illuminating a scene or an object in a scene is coupled to the image sensor 110 and the RU processing unit 102. When the remote unit 100 is mounted to the utility meter 90, the illuminator 112 is operative to illuminate the display area 82 in synchrony with the image captured by the image sensor 110. The illuminator 112 illuminates the display area 82 by projecting light onto the display area 82 through the aperture 34. In a non-limiting implementation, the illuminator 112 is implemented as an LED flash device.

Note that in the alternative embodiment in which the lower subsurfaces 16*b* and 18*b* are absent and replaced by a cutout section of the top surface 16 and the bottom surface 18, the illuminator 112 illuminates the display area 82 by projecting light through the aperture 34 and the cutout section of the top surface 16 and the bottom surface 18.

An illumination sensor 114 is preferably coupled to the illuminator 112 and the RU processing unit 102 to provide input to the RU processing unit 102 indicative of the amount of ambient light illuminating the display area 82. The illumination sensor 114 may be positioned proximate to the image sensor 110 or within the image sensor 110 housing (i.e., as part of the camera). The illumination sensor 114 provides electrical signals to the RU processing unit 102, allowing the RU processing unit 102 to adjust the intensity of the illuminator 112 based on the amount of ambient light detected by the illumination sensor 114. For example, if the image sensor 110 captures an image of the display area 82 during hours with a reasonably high amount of sunlight (e.g., daylight hours), the illuminator 112 may illuminate the display area 82 with a relatively low amount of illumination intensity. Conversely, if the image sensor 110 captures an image of the display area 82 during hours with a little to no amount of sunlight (e.g., evening or nighttime hours), the illuminator 112 may illuminate the display area 82 with a relatively high amount of illumination intensity.

The illuminator 112 and the image sensor 110 are preferably coupled to the power supply 116, which is connected to a power converter 128 or power conversion circuitry which adjusts the output of the power supply 116 according to the input power requirements of the corresponding component. The light intensity adjustment of the illuminator 112 enabled by the illumination sensor 114 decreases the power demanded by the illuminator 112, which decreases the overall power consumption of the remote unit 100, thereby providing significant power savings to the remote unit 100.

Figure 26:
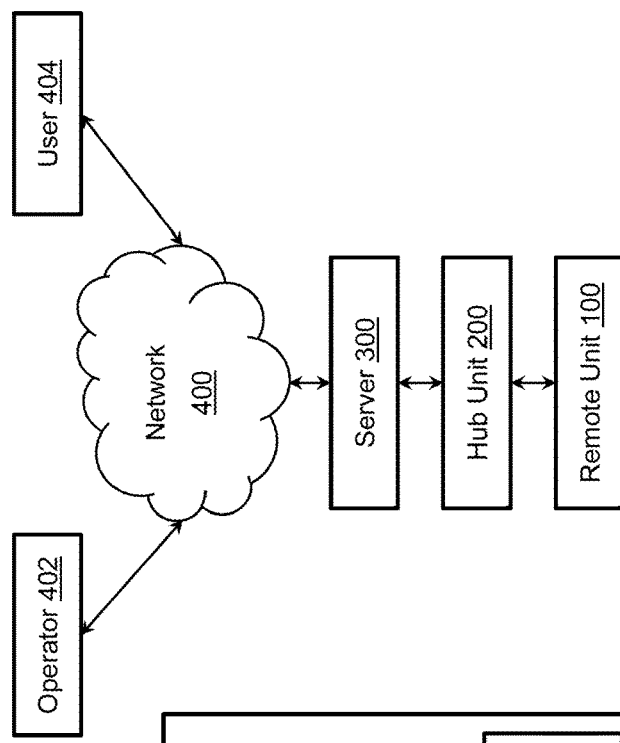
FIG. 26 is a diagram illustrating a system environment in which an embodiment of the invention is deployed, including a remote server communicating with the hub unit.
Figure 25:
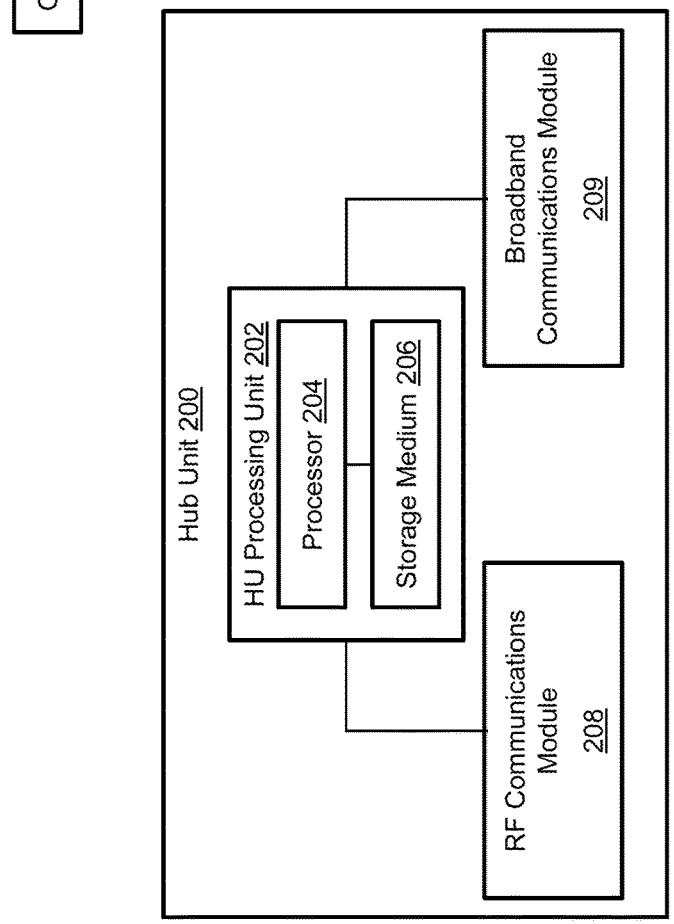
FIG. 25 is a block diagram of components of a hub unit communicating with the remote unit.

The images captured by the image sensor 110 may be stored in a local memory of the remote unit 100, such as the storage medium 106 or a flash memory device coupled to the RU processing unit 100. According to a particularly preferred embodiment of the present disclosure, image data derived from the images captured by the image sensor 110 is transmitted to a remote device, namely a hub unit 200 linked to the remote unit 100, for processing and routing over a wireless communications channel, as illustrated in FIGS. 25 and 26.

The transmission of the image data to the hub unit 200 is facilitated by a remote unit communications module 108, referred to hereinafter as the RU communications module 108, coupled to the RU processing unit 102. The RU communications module 108 includes hardware for generating signals based on actuation commands received from the RU processing unit 102. The RU communications module 108 is connected to the antenna 76, which propagates the signals generated by the RU communications module 108. According to certain preferred embodiments, the wireless communication channel through which the remote unit 100 transmits to the hub unit 200 is a radio frequency (RF) communication channel, and the RU communications module 108 is implemented as an RF communications module.

The image data derived from the captured images may be, for example, pixel data corresponding to a captured image or images, or may be compressed image data resulting from image compression. Preferably, the RU processing unit 102 compresses the captured images prior to actuating the RU communications module 108 to transmit the image data. The RU processing unit 102 may also encrypt the compressed images prior to transmission. The RU processing unit 102 may actuate the image sensor 110 to intermittently or periodically capture images, according to a programmable image capture schedule.

The RU communications module 108 receives transmit power from the power supply 116 via the power converter 128. Preferably, the RU communications module 108 is actuated by the RU processing unit 102 to transmit intermittently, for example, every few hours, thereby limiting the power consumption of the RU communications module 108 to several short intermittent bursts. The RU communications module 108 is also configured to receive signals bearing data and commands from the hub unit 200. The receipt of signals by the RU communications module 108 may be intermittent or periodic. The intermittent or periodic transmission/reception of signals by the RU communications module 108 may be set according to a programmable transmission schedule. The programmable schedules for transmission/ reception and image capture may be set by an operator 402 or an end user 404 of the remote unit 100 (FIG. 26), and managed by the RU processing unit 102. As such, the RU processing unit 102 is operative to actuate the RU communications module 108 to operate (i.e., selectively transmit and receive signals, and selectively capture images) according to the programmable schedules, based on commands received from the hub unit 200.

Note that the schedule for image capture and transmission/reception may be different schedules or the same schedules. For example, if the schedules are different, a single transmission by the RU communications module 108 may include more than one captured image. For example, the image sensor 110 may be configured to capture images of the display area 82 once every 12 hours, while the RU communications module 108 may be configured to transmit once every 36 hours. In such a configuration, three images may be included in a single transmission by the RU communications module 108, with some of the captured images being temporarily stored, for example in the storage medium 106, during periods when the RU communications module 108 is not scheduled to transmit.

With reference to FIG. 25, the hub unit 200 includes an RF communications module 208 for receiving the signal transmissions sent by the RU communications module 108, namely the compressed images transmitted by the RU communications module 108. Although not shown in the figures, the RF communications module 208 is connected to an RF antenna, for receiving the radiation propagated by the antenna 76.

The hub unit 200 further includes a hub unit processing unit 202, referred to hereinafter as the HU processing unit 202, that includes at least one processor 204 coupled to a storage medium 206 such as a memory or the like. The processor 204 can be any number of computer processors, including, but not limited to, a microcontroller, a microprocessor, an ASIC, a DSP, and a state machine. Such processors include, or may be in communication with computer readable media, which stores program code or instruction sets that, when executed by the processor, cause the processor to perform actions.

The transmissions received by the RF communications module 208 are sent to the HU processing unit 202 for image processing and analysis. Since the transmissions may include compressed and encrypted information, the HU processing unit 202 preferably performs functions to decrypt and decompress the received image data in order to revert the received image data to the original format as captured by the image sensor 110. The HU processing unit 202 further performs image processing techniques to analyze the images captured by the image sensor 110, to extract the meter reading and meter identification information (i.e., serial number) from the captured images. The extracted meter reading and meter identification information may be stored in a memory of the hub unit 200, such as, for example, the storage medium 206. In addition, the compressed or uncompressed images may be stored in a similar memory of the hub unit 200.

According to a non-limiting implementation, the HU processing unit 202 performs optical character recognition (OCR) algorithms to extract the meter reading and meter identification information from the captured images. In many utility meters, the meter reading is typically displayed as a series of numerical characters, with each character being one of multiple possible characters displayed on a dial. In many instances, one or more of the dials may be positioned in such a way that a portion of one or more numerical characters is displayed on each dial, which may result in inaccurate meter readings when using non-OCR based image processing techniques and algorithms. OCR algorithms are better equipped to handle such numerical character alignment issues. Therefore, the use of OCR algorithms by the HU processing unit 202 increases the accuracy of the meter reading extracted from the images captured by the image sensor 110.

With reference to FIG. 26, the meter reading and meter identification information extracted by the HU processing unit 202 is preferably transmitted to a central remote server 300, operated in cooperation with the utility company or utility service provider, via a broadband communications module 209. The broadband communications module 209 is configured to transmit and receive signals over a broadband communication channel. In a preferred but non-limiting implementation, the broadband communications module 209 is configured to transmit and receive signals over a cellular broadband communications channel, and more particularly is preferably implemented as a GSM transceiver coupled to a GSM antenna (not shown).

According to certain embodiments of the present disclosure, the remote server 300 is an Internet of Things (IoT) server which receives data and information from the hub unit 200 over a GSM channel. The remote server 300 is also configured to transmit commands, data and information to the hub unit 200 over the GSM channel via the broadband communications module 209. As such, the broadband communications module 209 is configured to transmit to, and receive from, the remote server 300, according to the specific communication protocols designated by the remote server 300, which according to certain embodiments is an IoT based protocol.

During normal operation, the remote server 300 receives information, from the hub unit 200, extracted from the images captured by the image sensor 110 by the HU processing unit 202. The receipt of such information may be in response to a command issued by the remote server 300, requesting the transmission of image information derived from images captured by the image sensor 110. The request may be initiated by the operator 402 or the end user 404 via a network, such as, for example, the network 400 illustrated in FIG. 26. The network 400 may be formed of one or more networks, including, for example, the Internet, cellular networks, wide area, public, and local networks.

The remote server 300, although illustrated as a single server, may represent numerous servers. The remote server 300 includes one or more computers or computing systems, which include processors or processing systems for performing computing functions.

The remote server 300 may request to receive from the hub unit 200 either the compressed or uncompressed version of the image itself. The remote server 300 makes the information, extracted from the images captured by the image sensor 110 by the HU processing unit 202, available to parties of interested, namely the utility provider and the end user 404. The information is made available through the network 400, and may be automatically sent to the parties of interest, or selectively upon request.

The RF communications module 208 is also configured to transmit signals bearing data and commands to the RU communications module 108. The HU processing unit 202 may process such commands, received from the remote server 300 by the broadband communications module 209, and actuate the RF communications module 208 to transmit to the RU communications module 108. In this way, in addition to processing images captured by the image sensor 110, the hub unit 200 functions as an intermediate command and control center of the remote unit 100.

Programming of settings of the remote unit 100, for example the transmission/reception schedule of the RU communications module 108, and the image capture schedule of the image sensor 110, is facilitated by the connection to the remote server 300, and may be set and uploaded to the remote server 300, by the operator 402 of the remote unit 100, through the network 400. In practice, the programmable settings are sent from the remote server 300 to the hub unit 200, which forwards the settings to the remote unit 100 via the RF communication link between the RF communications module 208 and the RU communications module 108.

Note that the operator 402 is typically a technician or other employee of the utility company or utility service provider that supplies the utility meter 80 to which the remote unit 100 is mounted. The operator 402 is not typically the utility customer, which is depicted in FIG. 26 as the end user 404. The end user 404 may access the data and information captured by the remote unit 100 through the network 400, via a personal communication device, such as, for example, a personal computer, cellular telephone, or smartphone. This allows the utility customer to view the utility consumption based on the images captured by the image sensor 110. The utility customer may also receive additional alerts and information associated with the usage of the utility meter 80 and the remote unit 100. The alerts and information may be generated based on local processing of the RU processing unit 102, processing of the HU processing unit 202, remote processing by the remote server 300, or shared processing by the RU processing unit 102, HU processing unit 202 and the remote server 300. The following paragraphs describe examples of some of the alerts and information which can be provided to the user 404 and the operator 402.

As described above, the image sensor 110 may be configured to capture an image of the display area 82 intermittently or periodically, for example every few hours. The meter reading extracted from each current captured image may be compared to one or more meter readings, or the average of one or more meter readings, from extracted from previously captured images, stored in the local memory of the remote unit 100 or stored in the storage medium 206 of the hub unit 200, to assess the likelihood of a leak. For example, if the current meter reading deviates from one or more previous meter readings, or the average of one or more previous meter readings, by an amount above a threshold, a potential leak may be detected. The HU processing unit 200 may then actuate the broadband communications module 209 to transmit a leak alert signal to the remote server 300, which may then be forwarded to the user 404.

Returning to FIG. 24, the remote unit 100 preferably further includes a power monitor 118 coupled to the RU processing unit 102 and the power supply 116 to provide input to the RU processing unit 102 indicative of the power status (i.e., charge status) of the power supply 118. The power monitor 118 preferably performs power related measurements on the power supply 118. For example, the power monitor 118 may measure the voltage of the power supply 116. If the measured voltage drops below a threshold level, the processing unit 102 may receive a low power status from the power monitor 118, and may then actuate the RU communications module 108 to transmit a signal to the hub unit 200 that includes information pertaining to the low power status indication. The signal bearing the low power status information is received by the RF communications module 208 of the hub unit 200, and the HU processing unit 202 actuates the broadband communications module 209 to forward the low power status information to the remote server 300, where the information can be assessed by the utility provider. If the power supply 116 of the remote unit 100 is below a threshold value, the operator 402 may be dispatched to the location of the remote unit 100 to perform maintenance activities, such as, for example, replacing the power supply 116.

The remote unit 100 preferably includes one or more sensors or components for detecting the location of the remote unit 100 and/or potential tampering with the remote unit 100 or the utility meter 80 to which the remote unit 100 is mounted. As illustrated in FIG. 24, the remote unit 100 preferably includes a tampering sensor arrangement 120 and a GPS unit 126, each coupled to the RU processing unit 102. The tampering sensor arrangement 120 includes a magnetometer 122 and an accelerometer 124.

The magnetometer 122 is operative to detect the presence of magnets external to the remote unit 100, which may be used to tamper with the utility meter 80 in order to distort the readings of the utility meter 80. For example, water meters typically measure water flow by employing spinning magnets. Any positioning of external magnets proximate to the spinning magnet of the water meter may result in inaccurate flow and/or consumption measurements, which may prove costly to the user 404. The magnetometer 122 measures magnetic field strength, and detects the presence of external magnets via a measured high change in measured magnetic field strength. The RU processing unit 102 actuates the RU communications module 108 to transmit a signal to the hub unit 200 upon receiving an indication of a high change in measured magnetic field strength from the magnetometer 122. The transmitted signal bears a tampering warning message based on the change in measured magnetic field strength. The signal is received by the RF communications module 208 of the hub unit 200, and the HU processing unit 202 actuates the broadband communications module 209 to forward the tampering warning message to the remote server 300, where the message can be assessed by the utility provider. The server 300 may also forward the tampering warning message to the user 404 via the network 400.

The accelerometer 124 is operative to detect positioning and orientation of the remote unit 100, and therefore the positioning and orientation of the utility meter 80. For example, water meters are typically required to be positioned horizontally to ensure proper measurement. Any rotation or tilt of the water meter may result in inaccurate measurements, which may become costly to the consumer. The accelerometer 124 measures the horizontal position of the remote unit 100, which is aligned with the utility meter 80. Any rotation or tilting action of the utility meter 80 will result in corresponding rotation or tilting of the remote unit 100. Upon mounting of the remote unit 100 to the utility meter 80 by the operator 402, a baseline position is measured by the accelerometer 124. and stored as a parameter. The parameter may be stored in a memory of the hub unit 200, on the remote server 300, or in a database or repository coupled to the remote server 300. The position measurements measured by the accelerometer 124 may be compared to the baseline position parameter to detect deviations or changes in position, via induced rotation or tilt. Such rotations or tilts may be induced by attempts to move the utility meter 80 or the remote unit 100 by an unauthorized party. The RU processing unit 102 actuates the RU communications module 108 to transmit a signal to the hub unit 200 upon receiving an indication of any position change from the accelerometer 124. The transmitted signal bears a malfunction, tampering, or theft warning message based on the position change. The signal is received by the RF communications module 208 of the hub unit 200, and the HU processing unit 202 actuates the broadband communications module 209 to forward the warning message to the remote server 300, where the message can be assessed by the utility provider. The server 300 may also forward the tampering warning message to the user 404 via the network 400.

The GPS unit 126 preferably includes a GPS receiver which allows the GPS unit 126 to determine the geographic location of the remote unit 100. Upon mounting of the remote unit 100 to the utility meter 80 by the operator 402, the geographic location of the remote unit 100 and the geographic location of the utility meter 80 are stored as parameters. The parameters may be stored in a memory of the hub unit 200, on the remote server 300, or in a database or repository coupled to the remote server 300. The remote server 300 also pairs the remote unit 100 with the utility meter 80. The geographic location of the remote unit 100 determined by the GPS unit 126 may be periodically compared with the stored locations parameters to detect any changes in location. If the RU processing unit 102 detects a change in geographical location compared to the stored location parameters, the RU processing unit 102 actuates the RU communications module 108 to transmit a signal to the hub unit 200 indicative of the geographical location change. The transmitted signal bears a malfunction, tampering, or theft warning message based on the location change. The signal is received by the RF communications module 208 of the hub unit 200, and the HU processing unit 202 actuates the broadband communications module 209 to forward the warning message to the remote server 300, where the message can be assessed by the utility provider. The server 300 may also forward the warning message to the user 404 via the network 400.

All of the above described parameters, including GPS location information, initial orientation and tilt information, initial magnetic field strength information, transmission/reception schedule of the RU communications module 108, and image capture schedule of the image sensor 110, are preferably uploaded to the remote server 300 upon installation of the remote unit 100 by the operator 402. The parameters may be adjusted by the operator 402 upon request by the utility provider or the end user 404.

Furthermore, additional parameters associated with the image sensor 110 may, such as, for example, image quality, resolution, and color output, may be uploaded to the remote server 300 upon installation of the remote unit 100, and may be remotely adjusted by the operator 402. For example, the operator 402 may remotely configure the image sensor 110 to capture images of the display area 82 in black and white, in color, and at various image resolutions. The compression level and the encryption level may also be uploaded upon installation and remotely adjusted by the operator 402.

In addition, the meter identification information (i.e., serial number) of the utility meter 80 is preferably uploaded to the remote server 300 upon installation of the remote unit 100. The serial number of the utility meter 80 is paired with the remote unit 100, and the pairing is stored on the remote server 300. During normal operation of the remote unit 100, the meter identification information (i.e., serial number) extracted from the images captured by the image sensor 110 is compared with the serial number stored on the remote server 300. The comparison may be performed by the HU processing unit 202 or by the remote server 300. In the event that the stored serial number and the extracted serial number do not match, the remote server is notified 300, for example via a signal transmitted by the broadband communications module 209 of the hub unit 200. The notification is preferably sent to the operator 402 for troubleshooting. For example, if the remote unit 100 is moved by an unauthorized party to a new location and mounted to a different utility meter, processing of a captured image of the display area of the different utility meter would result in an extracted serial number different from the serial number to which the remote unit 100 is paired. The remote unit 100 may then be located based on the geographical location information provided by the GPS unit 126.

If a customer (i.e., the user 404) changes residences, the utility provider may dispatch the operator 402 to the remove the remote unit 100 from the utility meter at the old residence, and mount the remote unit 100 to the utility meter at the new residence. The operator 402 may update (simultaneously or subsequently) parameters associated with the remote unit 100 that are stored on the remote server 300, or may upload new parameters, including, for example, the serial number of the new utility meter. For example, the operator 402 may pair the remote unit 100 with the utility meter at the new residence, and store the new pairing on the remote server 300.

Figure 27:
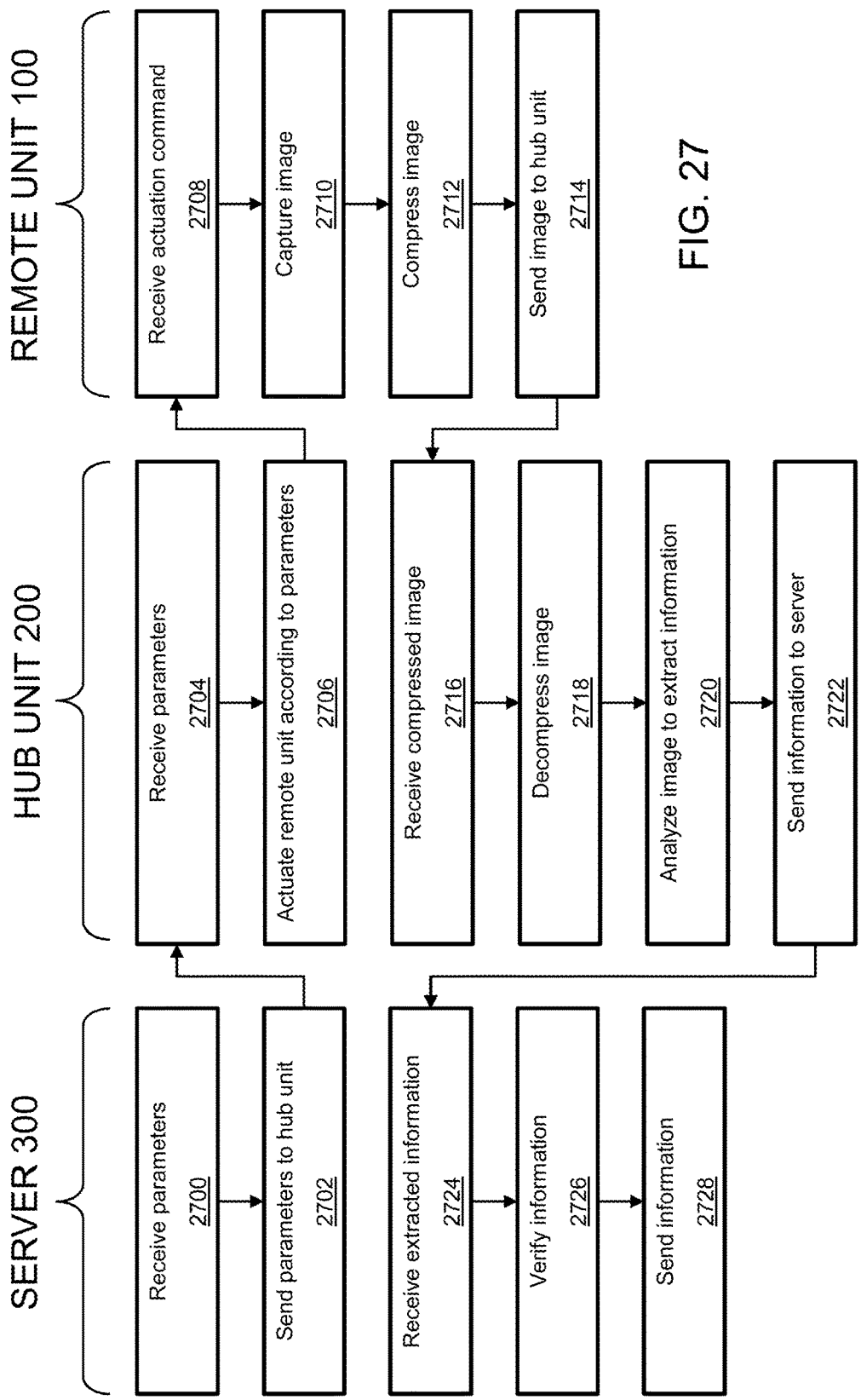
FIG. 27 is a flow diagram illustrating the command, control, and data transmission process between the remote server, hub unit and remote unit.

Attention is now directed FIG. 27 which shows a flow diagram detailing the flow of command, control, and data transmission between the remote server 300, the hub unit 200 and the remote unit 100. Many of the process and sub-processes illustrated in FIG. 27 are computerized processes performed by the remote server 300, the HU processing unit 202, and/or the RU processing unit 102. In the specific example illustrated in FIG. 27, the remote server 300 performs all verification functions. However, it should be clear from the above description of the functionality of the RU processing unit 102, the HU processing unit 202, and the remote server 300, that the processing for performing the verification functions may be shared across the RU processing unit 102, the HU processing unit 202, and the remote server 300.

Beginning at block 2700, the remote server 300 receives parameters related to the utility meter 80 and the remote unit 100. As described above, the parameters may be uploaded to the remote server 300 by the operator 402, which may be a technician or other employee of the utility company or provider which supplies the utility meter 80 to which the remote unit 100 is mounted. The parameters may include initial GPS location information, orientation and tilt information, magnetic field strength information, utility meter 80 identification information (i.e., serial number), image capture scheduling, and transmission/reception scheduling of the RU communications module 108. The scheduling parameters may be set to according to a variety of preferences, such as, for example, preferred hours of the day or preferred days of the week. For example, the remote unit 100 may be configured, according to the transmission/reception scheduling of the RU communications module 108, not to transmit or receive on Saturdays. The parameters may also include a request to receive information derived from the images captured by the image sensor 110, uploaded to the remote server 300 by the operator 402 or the end user 404.

The flow then moves to block 2702, where the remote server 300 transmits the relevant parameters to the hub unit 200, which are received by the broadband communications module 209 in block 2704. Moving to block 2706, the HU processing unit 202 actuates the remote unit 100 to operate according to the received parameters. The actuation in block 2706 is performed by transmitting a command from the hub unit 200 to the remote unit 100, via the RF communication link between the RF communications module 208 and the RU communications module 108. For example, if the parameters in block 2700 include a meter reading image request, in block 2706 the HU processing unit 202 actuates the RF communications module 208 to transmit the information (i.e., meter reading) derived image request to the remote unit 100.

The flow then moves to block 2708, where the RU communications module 108 receives the actuation commands, which are provided to the HU processing unit 102. Moving to block 2710, the RU processing unit 102 actuates the image sensor 110 to capture images according to the operational commands given by the HU processing unit 202. Moving to block 2712, the RU processing unit 102 compresses the image captured by the image sensor 110 in block 2710. Moving to block 2714, the compressed image is transmitted to the RF communications module 208 by the RU communications module 108.

The flow then moves to block 2716, where the RF communications module 208 receives the compressed image transmitted by the RU communications module 108. Moving to block 2718, the HU processing unit 202 decompresses the received image. Moving to block 2720, the HU processing unit 202 performs image processing algorithms, most preferably OCR algorithms, to extract information from the image.

The flow then moves to block 2722, where the broadband communications module 209 transmits the extracted information to the remote server 300. Moving to block 2724, the remote server 300 receives the information transmitted by the broadband communications module 209. Moving to block 2726, the remote server 300 verifies the information received in block 2724. Moving to block 2728, the remote server 300 sends information, over the network 400, based on the outcome of the verifying performed in block 2726. If the outcome of the verifying is that no tampering or malfunctions are detected, the information sent in block 2728 may be a meter reading extracted from the image captured in block 2710. If the outcome of the verifying is that potential tampering or malfunctions (e.g., leaks or equipment malfunction) are detected, the information sent in block 2728 may be warning message to the user 404 or the operator 402.

The user 404 may request to receive meter readings from the remote server 300, derived from the images captured by the image sensor 110, at intermittent or periodic intervals, for example hourly, daily, or weekly, or any other interval. The information sent to the user 404 from the remote server 300 may be sent via textual messaging services accessible via cellular telephone or tablet, such as, for example, short message service (SMS), multimedia messaging service (MMS), or other messaging services for sending textual information. Alternatively, or in addition, such information may be sent to the user 404 via electronic mail messages. Alternatively, or in addition, the information may be accessible via a web site or a web based application linked to the network 400, accessible to the end user 404 via a unique login credential. Alternatively, or in addition, such information may be sent to the user 404 via telephone voice services, such as, for example, cellular voice services, as a recorded voice message.

As should be apparent from the above description of the flow of command, control, and data transmission between the remote server 300, the hub unit 200 and the remote unit 100, the remote server 300 and the hub unit 200 provide capability for the selective actuation of the electronic and sensor components of the remote unit 100. The selective actuation allows the remote unit 100 to conserve the power supplied by the power supply 116, enabling the remote unit 100 to be deployed on site (i.e., mounted to the utility meter 80) for extended periods of time without necessitating frequent power supply changes. The selective actuation includes, for example, the RU processing unit 102 entering a sleep mode when no processing activity is required. As such, the RU processing unit 102 operates according to a unique sleep and wake protocol, based on the commands sent by the remote server 30 and the hub unit 200.

As should be clear from the above description, the remote unit 100, the hub unit 200, and the remote server 300 together form a system for performing meter reading functionality. Although the description of such a system has thus far pertained to a single remote unit communicating with a single hub unit over an RF communication channel, and the single hub unit communicating with a remote server over a cellular broadband communication channel, other embodiments are possible, in which multiple hub units communicate with the remote server 300 over a cellular broadband channel, and each hub unit communicates with multiple remote units over RF communication channels.

Figure 28:
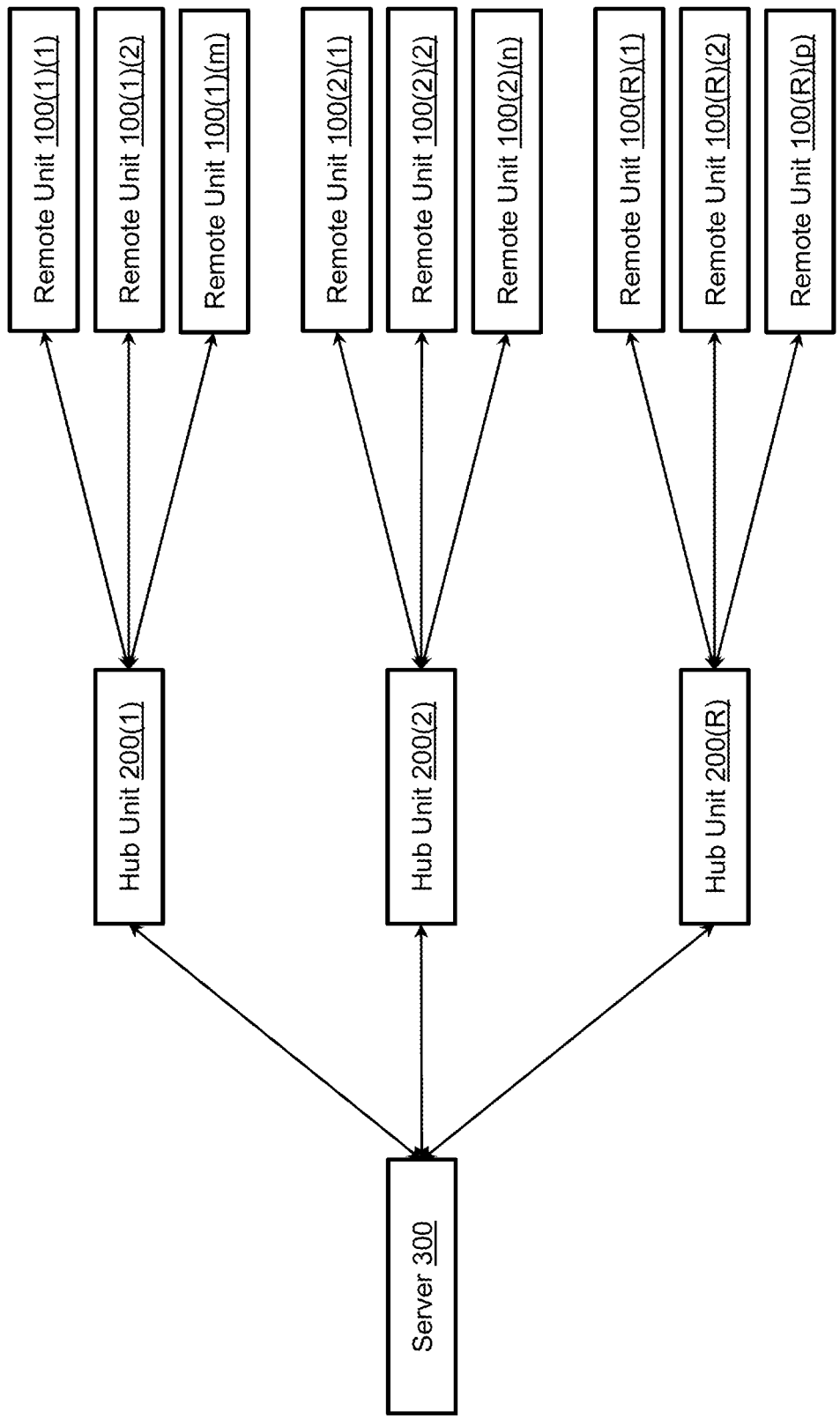
FIG. 28 is a block diagram illustrating multiple hub units coupled to the server, with each hub unit linked to multiple remote units.

With continued reference to FIGS. 24-26, refer now to FIG. 28, a system level block diagram illustrating multiple hub units and multiple remote units. Specifically, FIG. 28 illustrates a first hub unit 200(1), a second hub unit 200(2), and an $R^{th}$ hub unit 200(R), each linked to the remote server 300. The structure and operation of each of the hub units 200(1), 200(2) and 200(R) is similar to that of the hub unit 200, and will be understood by analogy thereto. Each of the hub units 200(1), 200(2) and 200(R) is linked to multiple remote units.

Specifically, the first hub unit 200(1) is linked to a first remote unit 100(1)(1), a second remote unit 100(1)(2), and an $m^{th}$ remote unit 100(1)(m), the second hub unit 200(2) is linked to a first remote unit 100(2)(1), a second remote unit 100(2)(2), and an $n^{th}$ remote unit 100(2)(n), and the $R^{th}$ hub unit 200(R) is linked to a first remote unit 100(R)(1), a second remote unit 100(R)(2), and a $p^{th}$ remote unit 100(R)(p). The structure and operation of each of the remote units 100(1)(1), 100(1)(2), 100(1)(m), 100(2)(1), 100(2)(2), 100(2)(n), 100(R)(1), 100(R)(2) and 100(R)(p) is similar to that of the remote units 100, and will be understood by analogy thereto. Each of the remote units 100(1)(1), 100(1)(2), 100(1)(m), 100(2)(1), 100(2)(2), 100(2)(n), 100(R)(1), 100(R)(2) and 100(R)(p) has a corresponding end user.

Note that each of the hub units 200(1), 200(2) and 200(R) may be operated by the same utility provider or a different utility provider. For example, the first hub unit 200(1), may be operated by the water authority, the second hub unit 200(2) may be operated by the gas authority, and the $R^{th}$ hub unit 200(R) may be operated by the electric power authority. In such an example, the remote units 100(1)(1), 100(1)(2) and 100(1)(m) are operative to capture images of the display area of a water utility meter, the remote units 100(2)(1), 100(2)(2) and 100(2)(n) are operative to capture images of the display area of a gas utility meter, and the remote units 100(R)(1), 100(R)(2) and 100(R)(p) are operative to capture images of the display area of an electric utility meter.

In practice, on the order of 100-200 remote units may be linked to a single hub unit. The linking of a relatively high number of remote units to a single hub unit, is ideal for deployment in residential apartment buildings and office buildings. For example, in a residential apartment building of 15-20 floor with 5-10 apartments per floor, a single hub unit may be deployed at approximately the center floor of the apartment building, providing enough proximity between the deployed remote units and the hub unit to maintain sufficient signal strength to operate the over RF communication channels.

It is noted herein that the communication modules 108, 208, 209 include hardware components for enabling the transmission and reception of signals according to the communication protocol relevant to the particular communication module. Such hardware components may include, but are not limited to, filters, amplifiers, oscillators, digital to analog converters, analog to digital converters, and modulators.

Although the system as described thus far has pertained to the remote unit 100 and the hub unit 200 communicating over an RF channel via respective communication modules (i.e., the RU communications module 108 and the RF communications module 208), other embodiments are possible in which communication in one or both directions is performed over a non-RF communication channel, such as, for example, a broadband wireless communications channel. In such an embodiment, the remote unit 100 may include a broadband communications module, in lieu of or in addition to the RU communications module 108, for receiving signals bearing data and commands from the broadband communications module 209 of the remote unit 200.

Alternatively, the RU communications module 108 may be implemented as a broadband communications module, such that the RU communications module 108 transmits signals to, and receives signals from, the broadband communications module 209 of the remote unit 200. In such an embodiment, the image data derived from a captured image or images is transmitted from the RU communications module 108 to the broadband communications module 209 over a wireless broadband communication channel.

Implementation of the device, system and/or method of embodiments of the present disclosure can involve performing or completing selected tasks manually, automatically, or a combination thereof. Moreover, according to actual instrumentation and equipment of embodiments of the device, system and/or method of embodiments of the present disclosure, several selected tasks could be implemented by hardware, by software or by firmware or by a combination thereof using an operating system.

For example, hardware for performing selected tasks according to embodiments of the present disclosure could be implemented as a chip or a circuit. As software, selected tasks according to embodiments of the invention could be implemented as a plurality of software instructions being executed by a computer using any suitable operating system. In an exemplary embodiment of the present disclosure, one or more tasks according to exemplary embodiments of the device, system and/or method as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment or implementation described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A device for reading a meter that includes a display area covered by a display cover, the device comprising:
   an electronics assembly including an image sensor for capturing an image of the display area of the meter, the image sensor including a lens having a field of view;
   a housing including a cover coupled to a base member including an aperture, the base member for communicating with the display cover of the meter, the electronics assembly being retained between the base member and the cover such that the lens is aligned with the aperture; and
   a fastening member including a hollow section accommodating a top portion of the cover to pass therethrough, the fastening member further including a mechanism for attaching the fastening member to a portion of the meter so as to maintain the display area of the meter in the field of view of the lens and bring the base member into communication with the display cover.

2. The device of claim 1, wherein the electronics assembly further includes a processing unit and a communications module, the processing unit for compressing the image captured by the image sensor, and the communications module for transmitting the compressed image to a hub unit over a wireless communication channel.

3. The device of claim 2, wherein the wireless communication channel is a radio frequency (RF) channel.

4. The device of claim 2, further comprising:
   an antenna coupled to the communications module, the antenna partially encircling a printed circuit board of the electronics assembly and held in place by engagement of the base member with the cover.

5. The device of claim 2, wherein the electronics assembly further includes a printed circuit board (PCB), and wherein the image sensor, the processing unit and the communications module are attached to the PCB.

6. The device of claim 5, wherein the cover is transparent, and wherein the PCB is dimensioned to allow visibility of the display area of the meter, through the cover, when the base member is coupled to the meter.

7. The device of claim 1, wherein the electronics assembly further includes an illuminator coupled to the image sensor for illuminating the display area of the meter.

8. The device of claim 7, wherein the electronics assembly further includes an illumination sensor coupled to the illuminator, and wherein an illumination intensity output of the illuminator is adjusted based on output of the illumination sensor.

9. The device of claim 1, wherein the electronics assembly further includes a tampering sensor arrangement including at least one of a magnetic sensor and an accelerometer.

10. The device of claim 1, wherein the display area of the meter includes at least one of a first region displaying a numerical meter reading, and a second region displaying an identifier of the meter.

11. The device of claim 1, wherein the fastening member includes: an annular body defined in part by an inner sidewall, an outer sidewall, and the hollow section, and wherein the mechanism includes at least one resiliently biased detent extending away from the annular body for engaging the portion of the meter.

12. The device of claim 1, wherein the base member further includes a two-sided central section that separates the base member into an upper portion and a lower portion, the lower portion being in communication with the display cover of the meter, and wherein the central section includes a window extending from one side of the central section to the other side of the central section, and wherein the window is aligned with the display area of the meter to provide a user of the device with an unobstructed view of the display area.

13. A system for reading a meter that includes a display area covered by a display cover, the system comprising:
   a remote unit including:
      an electronics assembly retained in a housing for communicating with the display cover of the meter, the electronics assembly including an image sensor for capturing images of the display area of the meter, and a remote unit communications module configured to transmit, over a first communications channel, image data derived from the images captured by the image sensor, and
      a fastening member for coupling the electronics assembly to the meter by passing a top portion of a cover of the housing through a hollow section of the fastening member so as to bring a base member of the housing into communication with the display cover, such that a lens of the image sensor is aligned with an aperture of the housing to view the display area of the meter through the aperture; and
   a hub unit including:
      a first hub unit communications module configured to receive the transmitted image data from the remote unit communications module over the first communications channel, and
      a hub unit processing unit including at least one processor coupled to a storage medium configured to:
         analyze the received image data to extract information from the image data, the information including at least an identifier of the meter and a meter reading of the meter for each of the images captured by the image sensor.

14. The system of claim 13, wherein the hub unit further comprises a second hub unit communications module, and wherein the system further comprises:
   a remote server for receiving data from the hub unit, wherein the second hub unit communications module is configured to transmit data to the remote server over a second communications channel.

15. The system of claim 14, wherein the hub unit processing unit is further configured to:
   actuate the second hub unit communications module to transmit the extracted information to the remote server, and wherein the remote server is configured to compare the identifier of each received image with a stored identifier associating the remote unit with the meter.

16. The system of claim 14, wherein the second hub unit communications module is further configured to receive data from the remote server over the second communications channel, the received data including a programmable transmit and receive schedule for the remote unit communications module, and wherein the first hub unit communications module is further configured to transmit the programmable transmit and receive schedule to the remote unit communications module, and wherein the hub processing unit is further configured to: actuate the remote unit communications module to operate according to the programmable transmit and receive schedule.

17. The system of claim 14, wherein the second hub unit communications module is further configured to receive a request from the remote server over the second communications channel, and wherein the hub processing unit is further configured to: actuate the remote unit communications module to transmit an image captured by the image sensor to the first hub unit communications module in response to the request.

18. The system of claim 14, wherein the first communications channel is a radio frequency (RF) channel, and wherein the second communications channel is a broadband communications channel.

19. The system of claim 13, wherein the electronics assembly further includes a remote unit processing unit including at least one processor coupled to a storage medium, the remote unit processing unit configured to derive the image data by compressing the images captured by the image sensor.

20. The system of claim 19, wherein the hub unit processing unit is further configured to:
   decompress the image data compressed by the remote unit processing unit.

* * * * *